(12) United States Patent
Bae et al.

(10) Patent No.: US 12,039,791 B2
(45) Date of Patent: Jul. 16, 2024

(54) IMAGE PROCESSING METHOD, AND ELECTRONIC DEVICE SUPPORTING SAME

(71) Applicant: Samsung Electronics Co., Ltd., Suwon-si (KR)

(72) Inventors: Sujung Bae, Suwon-si (KR); Donghyun Yeom, Suwon-si (KR); Changwon Kim, Suwon-si (KR); Hyunjin Kim, Suwon-si (KR); Imkyeong You, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 432 days.

(21) Appl. No.: 17/310,118

(22) PCT Filed: Jan. 17, 2020

(86) PCT No.: PCT/KR2020/000848
§ 371 (c)(1),
(2) Date: Jul. 16, 2021

(87) PCT Pub. No.: WO2020/149689
PCT Pub. Date: Jul. 23, 2020

(65) Prior Publication Data
US 2022/0101638 A1 Mar. 31, 2022

(30) Foreign Application Priority Data
Jan. 18, 2019 (KR) .......................... 10-2019-0007036

(51) Int. Cl.
*G06V 20/62* (2022.01)
*G06F 16/58* (2019.01)
(Continued)

(52) U.S. Cl.
CPC .......... *G06V 20/63* (2022.01); *G06F 16/5846* (2019.01); *G06F 16/5866* (2019.01); *G06V 20/20* (2022.01)

(58) Field of Classification Search
CPC .... G06V 20/63; G06V 20/20; G06F 16/5866; G06F 16/5846
See application file for complete search history.

(56) References Cited

U.S. PATENT DOCUMENTS 9,410,810 B2    8/2016  Lee et al.
10,502,580 B2   12/2019 Choi et al.
(Continued)

FOREIGN PATENT DOCUMENTS

KR    10-2010-0081725 A    7/2010
KR    10-2012-0021984 A    3/2012
(Continued)

OTHER PUBLICATIONS

International Search Report and Written Opinion of the International Searching Authority dated Apr. 27, 2020 in connection with International Application No. PCT/KR2020/000848, 9 pages.
(Continued)

*Primary Examiner* — Gregory M Desire

(57) ABSTRACT

Provided is an electronic device including a display, a memory, and a processor operatively coupled with the display and the memory, wherein the processor is configured to obtain an image, output to a display a screen on which at least one Augmented Reality (AR) object is added to the obtained image, create a file including a capture image of the screen and information related to the at least one AR object in response to reception of a capture input for the screen, and store the file in the memory. In addition, various embodiments conceived through this document are possible.

18 Claims, 17 Drawing Sheets

(51) Int. Cl.
*G06F 16/583* (2019.01)
*G06V 20/20* (2022.01)

(56) References Cited

U.S. PATENT DOCUMENTS

| | | | |
|---|---|---|---|
| 10,620,817 B2* | 4/2020 | Green | G06F 3/011 |
| 10,692,299 B2* | 6/2020 | Bhushan | G06F 3/011 |
| 10,748,347 B1* | 8/2020 | Li | G06T 19/20 |
| 10,771,638 B2* | 9/2020 | Anderson | G06T 7/0002 |
| 10,805,696 B1* | 10/2020 | Suiter | H04N 21/8545 |
| 2012/0050324 A1 | 3/2012 | Jeong et al. | |
| 2012/0105703 A1 | 5/2012 | Lee et al. | |
| 2012/0188396 A1 | 7/2012 | Kim | |
| 2014/0314391 A1 | 10/2014 | Kim et al. | |
| 2016/0063339 A1 | 3/2016 | Kwon et al. | |

FOREIGN PATENT DOCUMENTS

| | | |
|---|---|---|
| KR | 10-2012-0046991 A | 5/2012 |
| KR | 10-2012-0085474 A | 8/2012 |
| KR | 10-2014-0114238 A | 9/2014 |
| KR | 10-2016-0007473 A | 1/2016 |
| KR | 10-2017-0092408 A | 8/2017 |

OTHER PUBLICATIONS

Notice of Patent Grant dated May 4, 2023 in connection with Korean Patent Application No. 10-2019-0007036, 4 pages.
Notice of Preliminary Rejection dated Nov. 18, 2022 in connection with Korean Patent Application No. 10-2019-0007036, 10 pages.

* cited by examiner

IMAGE PROCESSING METHOD, AND ELECTRONIC DEVICE SUPPORTING SAME

CROSS-REFERENCE TO RELATED APPLICATIONS

This application is a 371 National Stage of International Application No. PCT/KR2020/000848, filed Jan. 17, 2020, which claims priority to Korean Patent Application No. 10-2019-0007036, filed Jan. 18, 2019, the disclosures of which are herein incorporated by reference in their entirety.

BACKGROUND

1. Field

Various embodiments of the disclosure relate to an image processing technique.

2. Description of Related Art

In an electronic device such as a smartphone or the like, various service schemes are under development to provide a user with a variety of information. For example, the electronic device may provide an Augmented Reality (AR) service to provide more useful information by merging a real world and a virtual world, in order to provide the user with information or images which cannot be expressed in the real world.

The electronic device which provides the AR service may obtain an image captured through a camera, analyze the image or determine a location and direction of the electronic device by using various sensors such as a Global Positioning System (GPS) or the like, determine an object of interest for which additional information is to be displayed in the image on the basis of the location and direction of the electronic device and attribute information of the camera, such as an angle of view, focal distance, or the like of the camera, and create a virtual object (e.g., an AR object) indicating the presence of the additional information on the object of interest. Thereafter, the virtual object may be synthesized with the image and displayed on a screen.

Meanwhile, the electronic device may provide the user with various convenient functions. For example, the electronic device may provide an interface to capture an image in response to a user input while content of interest is displayed on the screen so that the user can store and edit the image.

SUMMARY

However, when the existing electronic device captures a screen including an AR object, only a current screen may be captured, and information related to the AR object, for example, additional information on an object of interest corresponding to the AR object, may not be captured. In addition, in a state where the additional information on the object of interest corresponding to the AR object is displayed on the screen in response to a selection input of the AR object, even if the screen is captured, the existing electronic device may not store the capture image together in association with the capture image of the screen including the AR object. Accordingly, the user may have difficulty in distinguishing whether the capture image of the screen on which the additional information on the object of interest is displayed is an image captured in an AR situation.

Various embodiments of the disclosure may provide an image processing method in which, when a screen including an AR object is captured, the capture image and information related to the AR object are stored as one file, and an electronic device supporting the method.

According to an embodiment of various embodiments of the disclosure, an electronic device may include a display, a memory, and a processor operatively coupled with the display and the memory. The processor may be configured to obtain an image, output to a display a screen on which at least one Augmented Reality (AR) object is added to the obtained image, create a file including a capture image of the screen and information related to the at least one AR object in response to reception of a capture input for the screen, and store the file in the memory.

In addition, according to various embodiments of the disclosure, an image processing method of an electronic device may include obtaining an image, outputting, to a display of the electronic device, a screen on which at least one AR object is added to the obtained image, creating a file including a capture image of the screen and information related to the at least one AR object in response to reception of a capture input for the screen, and storing the file in a memory of the electronic device.

According to various embodiments of the disclosure, a capture image of a screen including an Augmented Reality (AR) object and information related to the AR object are stored in one file, so that the information related to the AR object can be easily conceived when searching for the capture image.

Further, according to various embodiments of the disclosure, even if the capture image and the information related to the AR object are stored in one file, compatibility can be maintained so that the file can be read by using a program which searches and discovers the existing general capture image.

In addition thereto, various effects that are directly or indirectly conceived through this document can be provided.

BRIEF DESCRIPTION OF THE DRAWINGS

The same or similar reference numerals in the drawings may be used for the same or similar components.

DETAILED DESCRIPTION

Figure 1:
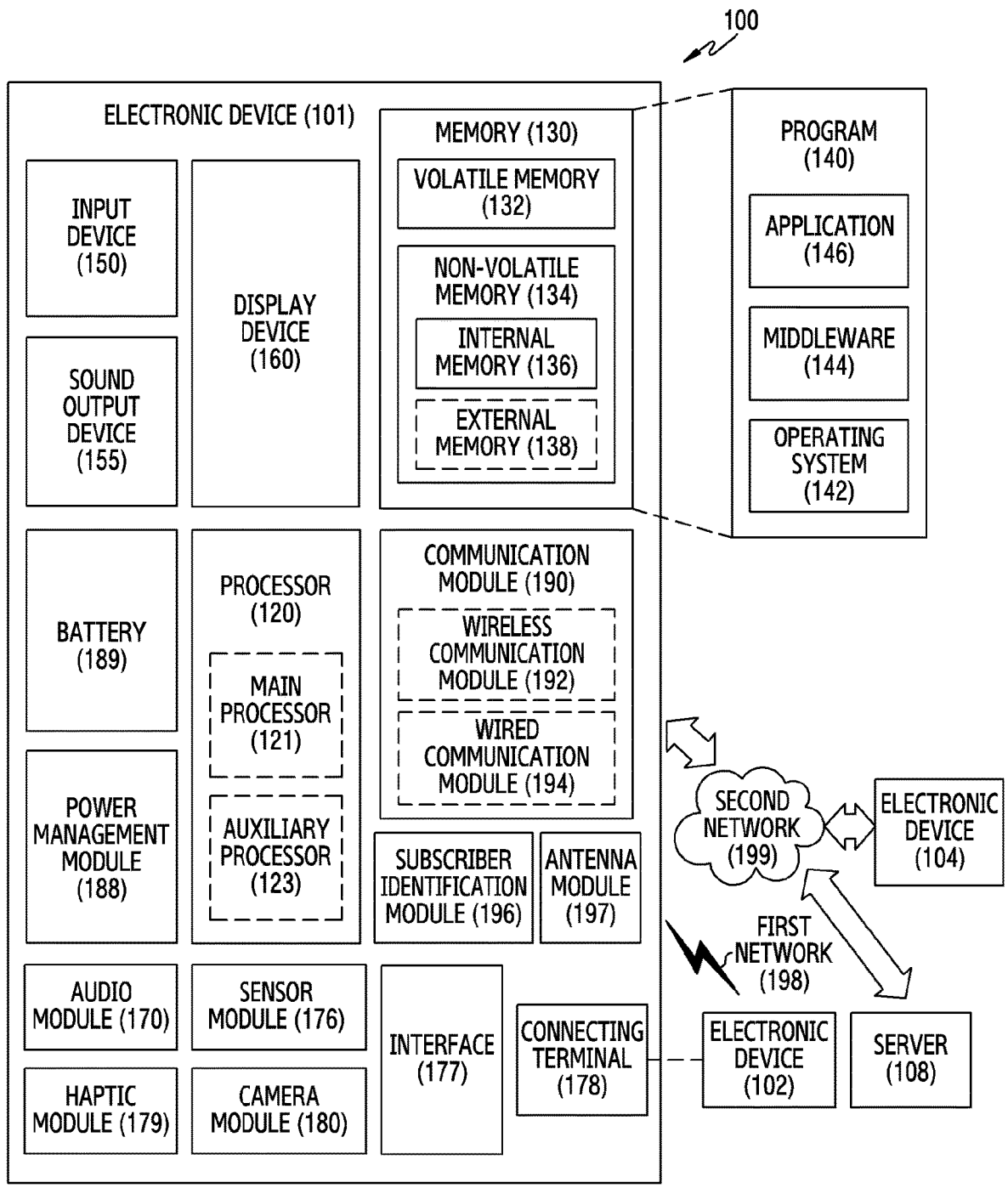
FIG. 1 is a block diagram of an electronic device in a network environment according to various embodiments.

Hereinafter, various embodiments of the disclosure will be described in detail with reference to the accompanying drawings. Components shown in the drawings may be exaggerated or reduced in size for convenience of explanation, and the disclosure is not necessarily limited thereto.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
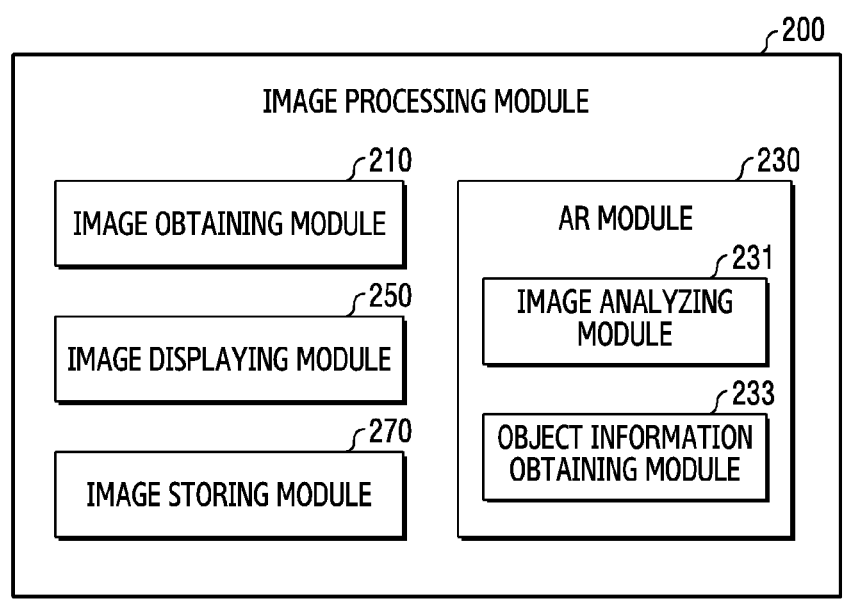
FIG. 2 is a drawing illustrating an image processing module according to an embodiment of the disclosure.

FIG. 2 is a drawing illustrating an image processing module according to an embodiment of the disclosure. An image processing module 200 of FIG. 2 may be implemented with a hardware or software component of the electronic device 101 of FIG. 1. For example, the image processing module 200 may be implemented in the form of the program 140 stored in the memory 130 of the electronic device 101. For example, the image processing module 200 may be implemented with an instruction stored in the memory 130. When the instruction is executed by the processor 120, the processor 120 may perform a function corresponding to the instruction.

The image processing module 200 may perform a function related to obtaining, displaying, and storing of an image, and may further perform a function of implementing an Augmented Reality (AR) on the image. Referring to FIG. 2, the image processing module 200 may include an image obtaining module 210, an AR module 230, an image displaying module 250, and an image storing module 270.

The image obtaining module 210 may obtain an image to be displayed on a screen of the display device 160 (e.g., a display). For example, the image obtaining module 210 may obtain a capture image from the camera module 180. As another example, the image obtaining module 210 may obtain an image from an external electronic device (e.g., the electronic device 102, the electronic device 104, or the server 108) through the communication module 190.

The AR implementing module 230 may implement the AR on the image. For example, the AR implementing module 230 may configure a real environment and a virtual object on one screen in such a manner that the virtual object (e.g., an AR object) is superimposed on a real image being watched by a user, thereby implementing the AR which provides additional information on the real environment. The AR implementing module 230 may include an image analyzing module 231 and an object information obtaining module 233.

The image analyzing module 231 may analyze an image obtained through the image obtaining module 210. For example, the image analyzing module 231 may recognize and extract objects from the image. In addition, the image analyzing module 231 may determine (or recognize) a specific number of objects of interest among the extracted objects. For example, the image analyzing module 231 may select a search region of a specific range corresponding to the location and direction of the electronic device 101 on the basis of map information, and may determine the object of interest among the objects which are present in the selected search region. Alternatively, the image analyzing module 231 may determine the object of interest among the objects which are present within an angle of view by which the camera module 180 captures the image in the selected search region.

According to an embodiment, in order to determine the location and direction of the electronic device 101, the image analyzing module 231 may search an object indicating a specific region (e.g., an object corresponding to a landmark) from the extracted objects, and may determine the location and direction of the electronic device 101, based on the found object. According to another embodiment, the image analyzing module 231 may determine the location of the electronic device 101 through a positioning module (e.g., a GPS module), and may determine the direction of the electronic device 101 by using at least one of an acceleration sensor, a geomagnetic sensor, and a gyro sensor.

The object information obtaining module 233 may obtain additional information on the determined object of interest. For example, the object information obtaining module 233 may obtain the additional information on the object of interest from an external electronic device (e.g., the electronic device 102, the electronic device 104, or the server 108) through the communication module 190. As another example, the object information obtaining module 233 may obtain the additional information on the object of interest by using map information pre-stored in the memory 130 and information on an object corresponding to each point on a map mapped to the map information. In relation thereto, the additional information on the object of interest may include information such as a name, location, description, or the like of the object of the interest. In addition, the additional information on the object of interest may include route guidance information related to the location of the object of interest, Point Of Interest (POI) information, shopping information, advertisement information, or the like. The additional information on the object of interest may be provided as various types of content. For example, the additional information on the object of interest may be provided as an image, a text, a video, a document, or the like.

The AR implementing module 230 may create a virtual object (e.g., an AR object) indicating the presence of the additional information on the object of interest. The AR object may include, for example, an image, a text, an icon, or the like. According to an embodiment, the AR implementing module 230 may create a type or graphical element (e.g., shape, color, etc.) of the AR object depending on a type (e.g., an image, a text, a video, a document, etc.) of the additional information on the object of interest.

The AR implementing module 230 may add (or synthesize) the AR object to the obtained image. For example, the AR implementing module 230 may synthesize the AR object to the obtained image in a superimposed manner on the object of interest corresponding to the AR object.

The image displaying module 250 may display the image through the display device 160. For example, the image displaying module 250 may display to the display device 160 the image obtained through the image obtaining module 210. As another example, the image displaying module 250 may obtain an image to which the AR object is added from the AR implementing module 230 and may display the image to the display device 160.

The image storing module 270 may store the image in the memory 130. For example, the image storing module 270 may store in the memory 130 the image obtained through the image obtaining module 210. As another example, the image storing module 270 may store in the memory 130 a capture image for the screen in response to a capture input for the screen of the display device 160. In this case, if the screen is a screen on which an AR object is added, the image storing module 270 may store in the memory 130 a file including the capture image for the screen and information related to the AR object. The information related to the AR object may include, for example, additional information on the object of interest corresponding to the AR object, information on a type of the additional information, storage location information of the additional information, location information of the AR object, information on the number of AR objects, information on whether the AR object is a main AR object, or the like.

As described above, according to various embodiments, an electronic device (e.g., the electronic device 101) may include a display (e.g., the display device 160), a memory (e.g., the memory 130), and a processor (e.g., the processor 120) operatively coupled with the display and the memory. The processor may be configured to obtain an image, output to a display a screen on which at least one AR object is added to the obtained image, create a file including a capture image of the screen and information related to the at least one AR object in response to reception of a capture input for the screen, and store the file in the memory.

According to various embodiments, the processor may be configured to obtain, from a camera (e.g., the camera module 180) included in the electronic device, an image captured by the camera as the image, or obtain the image from an external electronic device coupled through a communication module (e.g., the communication module 190) included in the electronic device.

According to various embodiments, the file may have an extended image file format. The processor may be configured to store information related to the at least one AR object in an extended region of the file.

According to various embodiments, the processor may be configured to, if a type of additional information on an object of interest corresponding to the at least one AR object among objects included in the obtained image is an image and is not a text image, allow image data of the additional information to be included in the information related to the AR object.

According to various embodiments, the processor may be configured to, if a type of additional information on an object of interest corresponding to the at least one AR object among objects included in the obtained image is a text image, extract the text from the additional information, and allow the extracted text to be included in the information related to the AR object.

According to various embodiments, the processor may be configured to, if a type of additional information on an object of interest corresponding to the at least one AR object among objects included in the obtained image is not an image, store the additional information in the memory or an external electronic device coupled through a communication module included in the electronic device, and allow storage location information of the additional information to be included in the information related to the AR object.

According to various embodiments, the processor may be configured to, if the additional information is stored in the external electronic device, set storage location information of the additional information as link information for accessing the external electronic device, and if the additional information is stored in the memory, set the storage location information of the additional information as storage address information of the memory.

According to various embodiments, the at least one AR object may include a plurality of AR objects. The processor may be configured to, if a user input in which a pressure greater than or equal to a specified magnitude is applied at a point on the screen for a specified period of time, set an AR object corresponding to an input location of the user input among the plurality of AR objects as a main AR object, and allow information indicating that the AR object is the main AR object to be included in information related to the AR object.

According to various embodiments, the at least one AR object may include a plurality of AR objects. The processor may be configured to, if a user input which continues from a first point to a second point on the screen is received, confirm the number of at least one AR object included in an input region of the user input, determined by the first point and the second point, among the plurality of AR objects, and allow information on the determined number of the at least one AR object to be included in information related to the AR object.

According to various embodiments, the at least one AR object may include a plurality of AR objects. The processor may be configured to, if a user input which continues from a first point to a second point on the screen is received, select at least one AR object included in an input region of the user input, determined by the first point and the second point, among the plurality of AR objects, and exclude information on another AR object other than the selected at least one AR object from information related to the AR object.

Figure 3:
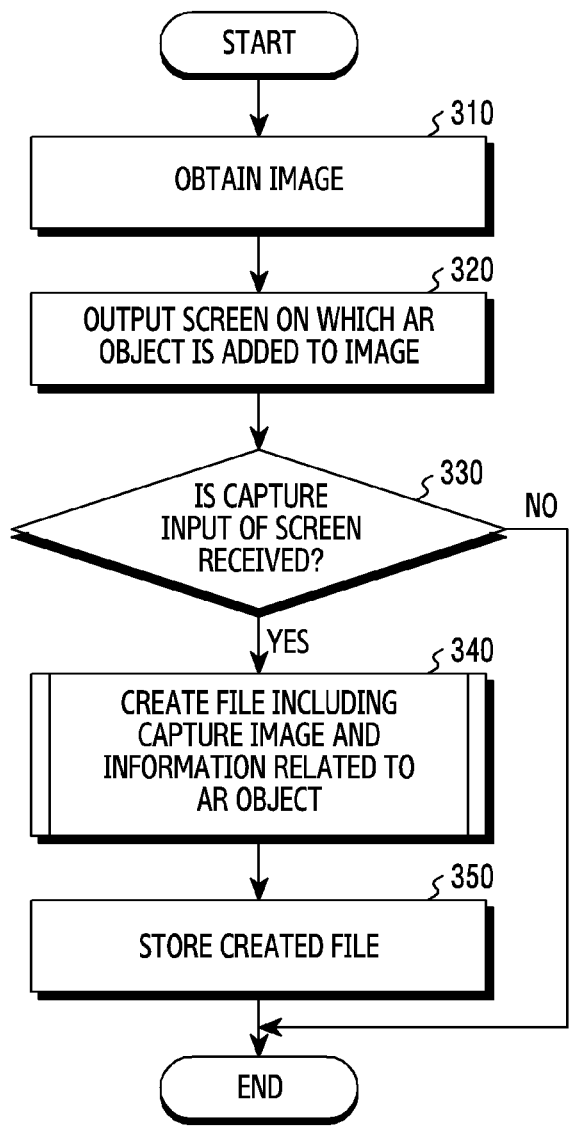
FIG. 3 is a drawing for explaining an image processing method according to an embodiment of the disclosure.

FIG. 3 is a drawing for explaining an image processing method according to an embodiment of the disclosure.

Referring to FIG. 3, in operation 310, the electronic device 101 including the image processing module 200 may obtain an image through the image obtaining module 210 of the image processing module 200. For example, the image obtaining module 210 may obtain a capture image from the camera module 180. As another example, the image obtaining module 210 may obtain the image from an external electronic device (e.g., the electronic device 102, the electronic device 104, or the server 108) through the communication module 190.

In operation 320, the electronic device 101 may output to the display device 160 the screen on which the AR object is added to the obtained object, through the image displaying module 250 of the image processing module 200. In order to obtain the screen on which the AR object is added to the obtained image, the AR implementing module 230 of the image processing module 200 may analyze the obtained image, through the image analyzing module 231. For example, the image analyzing module 231 may recognize and extract objects from the obtained image, and may determine a specific number of objects of interest among the extracted objects. In addition, the image analyzing module 231 may search an object indicating a specific region from objects extracted from the obtained image, may determine the location and direction of the electronic device 101 on the basis of the found object or determine the location of the electronic device 101 through a positioning module (e.g., a GPS module), and may determine the direction of the electronic device 101 by using at least one of an acceleration sensor, a geomagnetic sensor, and a gyro sensor. Thereafter, the object information obtaining module 233 of the image processing module 200 may obtain additional information on the determined object of interest. In addition, the AR implementing module 230 may create an AR object indicating the presence of additional information on the object of interest, and may add (or synthesize) the AR object to the obtained image. For example, the AR implementing module 230 may synthesize the AR object to the obtained image in a superimposed manner on the object of interest corresponding to the AR object.

In operation 330, the electronic device 101 may determine whether a capture input of the screen is received. For example, the electronic device 101 may determine whether the capture input for the screen on which the AR object is added to the obtained image is received, through the input device 150 or the sensor module 176. According to an embodiment, the capture input may include a user's voice input received through a microphone included in the input device 150. For example, when the user utters a voice including a specified expression (for example, "capture") and receives the voice input through the microphone, the electronic device 101 may determine that the capture input is received. According to another embodiment, the capture input may include a touch input received through a mouse or digital pen included in the input device 150 or a key input received through a keyboard or a physical button. For example, when the user touches a display object corresponding to a capture command by using the mouse or the digital pen, presses a key corresponding to the capture command among keys included in the keyboard, or presses a physical button corresponding to the capture command, the electronic device 101 may determine that the capture input is received. According to another embodiment, the capture input may include a user's gesture input received through at least one sensor included in the sensor module 176 or a motion input of the electronic device 101. For example, when the sensor module 176 detects a specified gesture taken by the user or when the user shakes, flips, or moves the electronic device 101 so that the electronic device 101 performs a motion corresponding to a specified direction, distance, and number of times, the electronic device 101 may determine that the capture input is received.

Upon determining that the capture input of the screen is received, in operation 340, the electronic device 101 may create a file including the capture image for the screen and information related to the AR object (e.g., additional information on the object of interest) through the image processing module 200. A function related to file creation will be described in detail with reference to FIG. 4.

In operation 350, the electronic device 101 may store the created file in the memory 130 through the image storing module 270 of the image processing module 200. For example, the image storing module 270 may store in the memory 130 the file including the capture image for the screen and the information related to the AR object.

Figure 4:
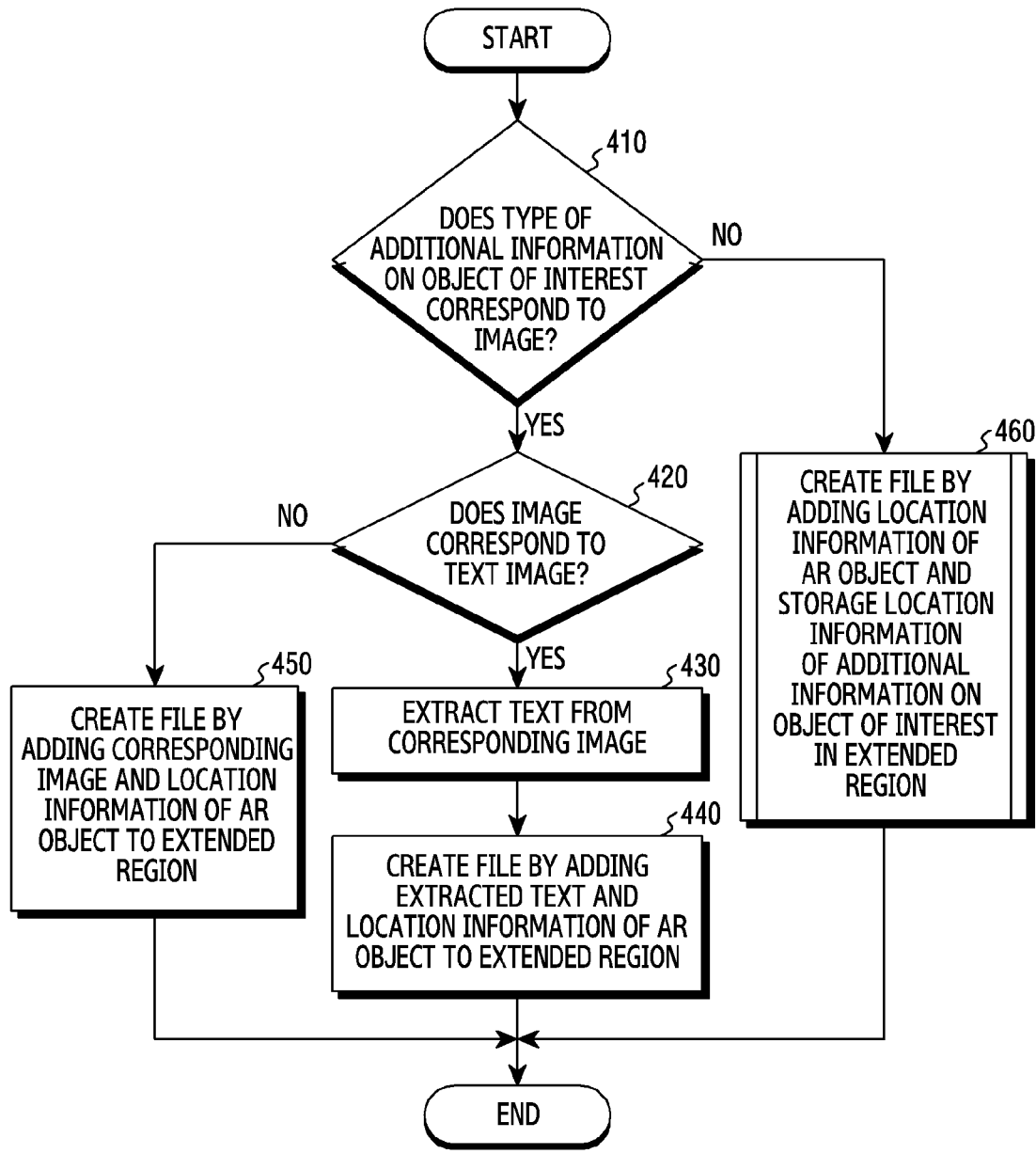
FIG. 4 is a drawing for explaining a method of creating a capture image file depending on a type of additional information on an object of interest corresponding to an Augmented Reality (AR) object according to an embodiment of the disclosure.

FIG. 4 is a drawing for explaining a method of creating a capture image file depending on a type of additional information on an object of interest corresponding to an AR object according to an embodiment of the disclosure.

Referring to FIG. 4, upon receiving a capture input for a screen on which an AR object is added, the electronic device 101 may create a file (a capture image file) including a capture image for the screen and information related to the AR object through the image processing module 200. In this case, the image processing module 200 may create the capture image file differently depending on a type of additional information on an object of interest corresponding to the AR object.

In operation 410, the image processing module 200 may determine whether the type of additional information on the object of interest is an image. For example, the image processing module 200 may determine whether a data format of the additional information on the object of interest is the image.

If the type of additional information on the object of interest is the image, in operation 420, the image processing module 200 may determine whether the type of additional information on the object of interest is a text image. Herein, the text image may be an image including a single line or multiple lines of a text of a print letter.

If the type of additional information on the object of interest is the text image, in operation 430, the image processing module 200 may extract a text from the additional information on object of interest having a text image format through an Optical Character Recognition (OCR) technique.

When the text is extracted, in operation 440, the image processing module 200 may create the capture image file by adding the extracted text and location information of the AR object to an extended region of the capture image file having an extended image file format. Herein, the location information of the AR object may include coordinate information on the screen on which the AR object is displayed. In addition, the extended image file format is an image file format which may include image data and additional information, and may include, for example, an Exchangeable image file format (Exif), a Samsung Extended Format (SEF), of the like.

The image processing module 200 may extract a text from the text image and store the extracted text instead of directly storing the additional information on the object of interest having the text image format in the capture image file, thereby decreasing a size of the capture image file. Accordingly, utilization of a storage space of the memory 130 in which the capture image file is stored can be enhanced, and a speed of processing the capture image file can be improved.

If the type of the additional information on the object of interest is not the text image (in case of a general image), in operation 450, the image processing module 200 may create the capture image file by adding location information of the AR object and additional information (a corresponding image) on the object of interest having an image format to an extended region of the capture image file having an extended image file format. For example, the image processing module 200 may store coordinate information on the screen on which the AR object is displayed and image data of additional information on the object of interest in the extended region of the capture image file.

If the type of the additional information on the object of interest is not the image, in operation 460, the image processing module 200 may create the capture image file by adding location information of the AR object and storage location information of the additional information on the object of interest in the extended region of the capture image file having the extended image file format. For example, if the type of the additional information on the object of interest is a video, a document (e.g., a portable document format (pdf) document), or a data type having a format which is difficult to be displayed on a screen through an image search application (e.g., a gallery application), the image processing module 200 may store only storage location information of the additional information on the object of interest in an extended region of the capture image while storing the additional information on the object of interest in the memory 130 or an external server, instead of storing the additional information on the object of interest directly in the extended region of the capture image file. A function related to setting storage location information of the additional information on the object of interest will be described in detail with reference to FIG. 5.

Although a function in which the image processing module 200 stores information related to the AR object (e.g., additional information on an object of interest corresponding to the AR object) in the extended region of the file having the extended image file format has been described above with reference to FIG. 4, a storage location of the information related to the AR object is not limited to the extended region. According to various embodiments, the image processing module 200 may store at least part (e.g., location information of the AR object, an extracted text, storage location information of the additional information on the object of interest, information indicating the number of AR objects, information indicating a main AR object, etc.) of the information related to the AR object in a metadata region of a file.

Figure 5:
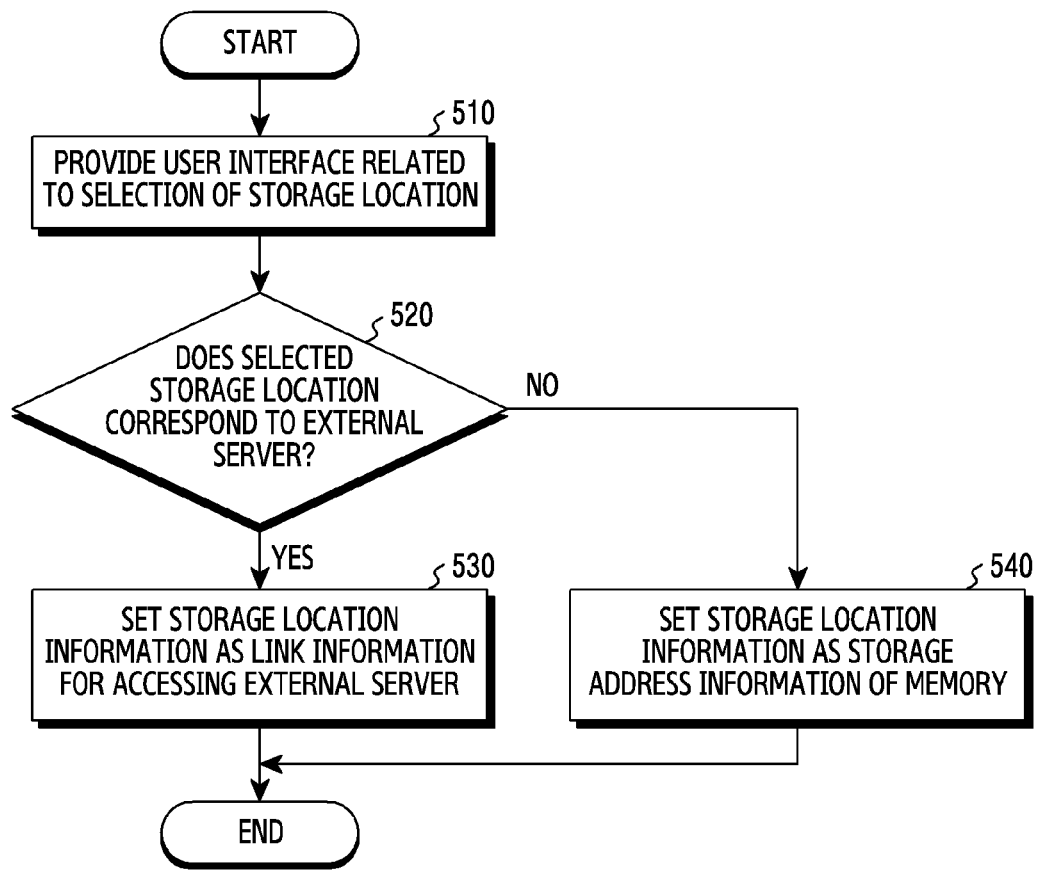
FIG. 5 is a drawing for explaining a method of creating a capture image file depending on a location for storing additional information, if a type of the additional information on an object of interest corresponding to an AR object is not an image, according to an embodiment of the disclosure.

FIG. 5 is a drawing for explaining a method of creating a capture image file depending on a location for storing additional information, if a type of the additional information on an object of interest corresponding to an AR object is not an image, according to an embodiment of the disclosure.

Referring to FIG. 5, if the type of the additional information on the object of interest corresponding to the AR object is not the image, the electronic device 101 may create the capture image file through the image processing module 200 by adding information on a location, at which additional information on the object of interest is stored, to an extended region of a file (a capture image file) having an extended image file format. In this case, the image processing module 200 may differently set storage location information of the additional information on the object of interest according to a storage location of the additional information on the object of interest.

In operation 510, the image processing module 200 may provide a user interface related to selection of a location at which the additional information on the object of interest is to be stored. For example, the image processing module 200 may provide a user interface so that a user can select a storage location of the additional information on the object of interest. The user interface may be implemented with, for example, the input device 150, the sound output device 155, the sensor module 176, and/or the display device 160. For example, the image processing module 200 may output a voice for guiding the user to select the storage location of the additional information on the object of interest through the sound output device 155, and may receive a user input for selecting the storage location of the additional information on the object of interest through the input device 150, the sensor module 176, and/or the display device 160. As another example, the image processing module 200 may output a display object (e.g., a list object including information on a plurality of storage locations) for guiding the user to select the storage location of the additional information on the object of interest, and may receive a user input for selecting the storage location of the additional information on the object of interest through the input device 150, the sensor module 176, and/or the display device 160.

In operation 520, the image processing module 200 may determine whether the selected storage location corresponds to an external server. For example, the image processing module 200 may determine whether the storage location of the additional information on the object of interest selected by the user through the user interface corresponds to the external server. The external server may include, for example, a cloud server.

If the selected storage location corresponds to the external server, in operation 530, the image processing module 200 may set storage location information of additional information on the object of interest as link information (e.g., URL access information) for accessing the external server. In this case, upon selecting the link, the image processing module 200 may access the external server corresponding to the link information to output additional information on the object of interest through an application capable of outputting the additional information on the object of interest. In this case, the application may be in a state of being installed in the external server or in a state of being installed in the electronic device 101. For example, if the application is in the state of being installed in the external server, the image processing module 200 may transmit a signal for requesting to output the additional information on the object of interest while accessing the external server, and may be provided an output screen of the additional information on the object of interest through the application for accessing the external server. As another example, if the application is in the state of being installed in the electronic device 101, the image processing module 200 may receive the additional information on the object of interest by accessing the external server, execute the application, and output the additional information on the object of interest received through the application.

If the selected storage location does not correspond to the external server (if it corresponds to the memory 130 of the electronic device 101), in operation 540, the image processing module 200 may set storage location information of the additional information on the object of interest as storage address information (e.g., storage path information) of the memory 130. In this case, the image processing module 200 may obtain the additional information on the object of interest stored in the memory 130 on the basis of the storage address information of the memory 130, execute the application capable of outputting the additional information on the object of interest, and output the additional information on the object of interest through the application.

According to an embodiment, the operations 510 and 520 may be omitted, and in operation 530, the image processing module 200 may set the storage location information of the additional information on the object of interest as link information for accessing the external server. For example, if the type of the additional information on the object of interest is not the image, the image processing module 200 may store the additional information on the object of interest in the external server as a default setting, and may set storage location information of the additional information on the object of interest as the link information for accessing the external server.

According to an embodiment, the operations 510 and 520 may be omitted, and in operation 540, the image processing module 200 may set the storage location information of the additional information on the object of interest as storage address information of the memory 130. For example, if the type of the additional information on the object of interest is not the image, the image processing module 200 may store the additional information on the object of interest in the memory 130 as a default setting, and may set the storage location information on the additional information on the object of interest as storage address information of the memory 130.

Figure 6:
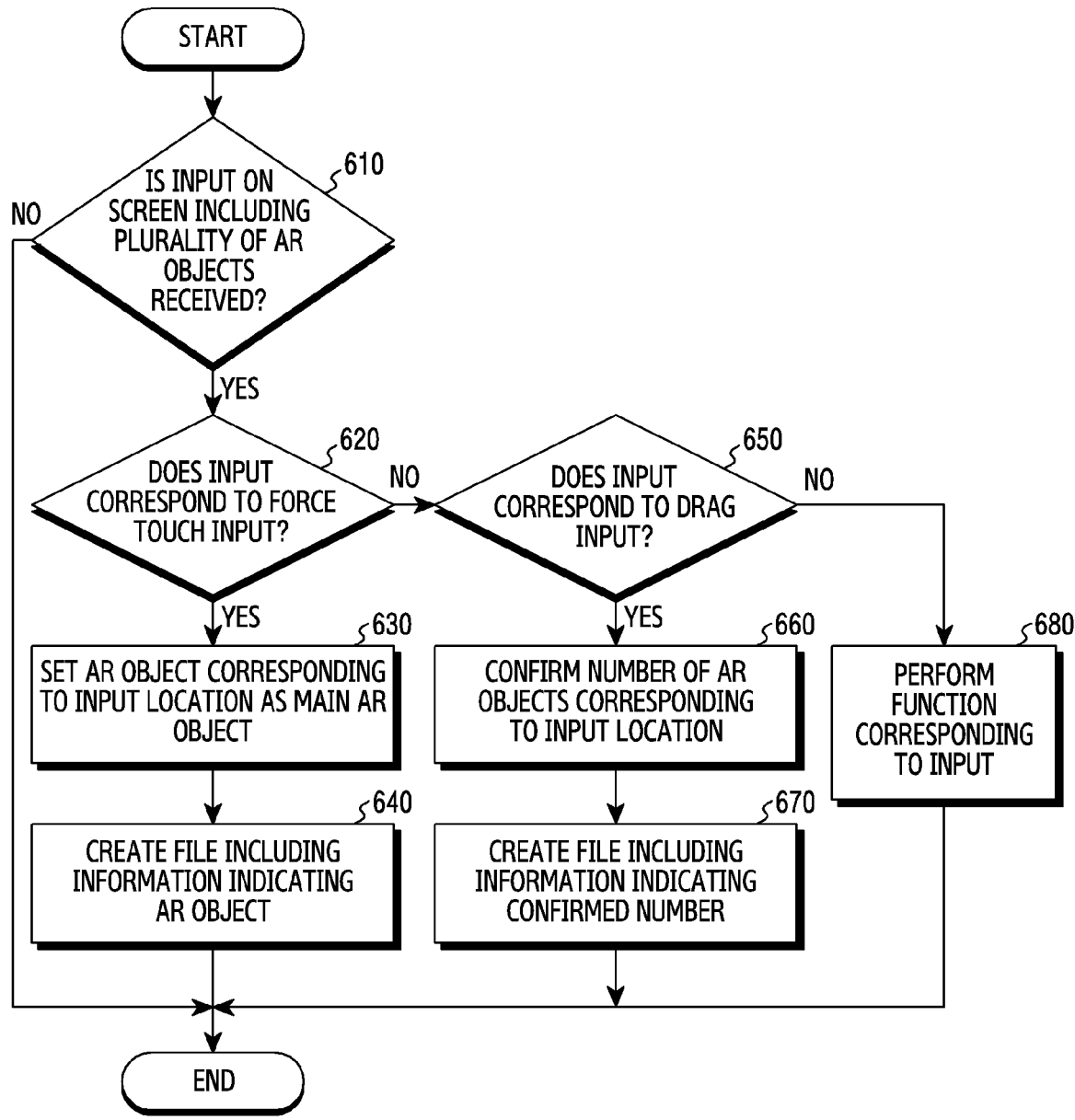
FIG. 6 is a drawing for explaining a method of creating a capture image file for a screen including a plurality of AR objects according to an embodiment of the disclosure.

FIG. 6 is a drawing for explaining a method of creating a capture image file for a screen including a plurality of AR objects according to an embodiment of the disclosure.

Referring to FIG. 6, upon receiving a capture input for the screen including the plurality of AR objects, the electronic device 101 may store information related to the plurality of AR objects together with the capture image in a file (e.g., a capture image file), or may store information related to at least one AR object selected from among the plurality of AR objects in the capture image file together with the capture image, through the image processing module 200.

In operation 610, the image processing module 200 may determine whether an input on the screen including the plurality of AR objects is received. For example, the image processing module 200 may determine whether the input on the screen is received, through the input device 150 or the sensor module 187.

In operation 620, the image processing module 200 may determine whether the input is a force touch input. The force touch input may be detected by a pressure sensor when a pressure greater than or equal to a specified magnitude is applied at a point on the screen for a specified period of time.

If the input is the force touch input, in operation 630, the image processing module 200 may set an AR object corresponding to an input location of the input as the main AR object. For example, the image processing module 200 may set the AR object corresponding to the input location as the main AR object among the plurality of AR objects output on the screen.

In operation 640, the image processing module 200 may create the capture image file by including additional information related to the plurality of AR objects and information indicating the main AR object. For example, the image processing module 200 may store the additional information related to the plurality of AR objects in an extended region of the capture image file, and may create the capture image file by including tag information indicating the main AR object.

If the input is not the force touch input, in operation 650, the image processing module 200 may determine whether the input is a drag input. The drag input is a touch input which continues from a first point (a start point) to a second point (an end point) on the screen (i.e., a touch object such as a finger moves continuously without being taken off from the screen), and may be detected by a touch circuit (or a touch sensor).

If the input is the drag input, in operation 660, the image processing module 200 may identify at least one AR object corresponding to an input location of the input, and may confirm the number of the AR objects. For example, the image processing module 200 may identify at least one AR object included in an input region corresponding to the input location (a rectangular region formed by the start point and end point of the drag input) among a plurality of AR objects output on the screen, and may confirm the number of the at least one AR object.

In operation 670, the image processing module 200 may create the capture image file including additional information related to the identified at least one AR object and information indicating the number of the at least one AR object. For example, the image processing module 200 may store the additional information related to the identified at least one AR object in the extended region of the capture image file, and may create the capture image file by including tag information indicating the number of the at least one AR object.

If the input is not the drag input (e.g., if the input is not the force touch input and the drag input), in operation 680, the image processing module 200 may perform a function corresponding to the input. For example, if the input is a capture input, the image processing module 200 may create the capture image file by including information related to the plurality of AR objects and the capture image. As another example, if the input is a pinch-in or pinch-out input, the image processing module 200 may reduce or enlarge the screen.

Regarding the aforementioned operation 620, the type of the user input for specifying (or setting) the main AR object is not limited only to the force touch input. According to various embodiments, as a user input for specifying (or setting) the main AR object, a long pressed touch input may be used in which a point on the screen is touched for at least a specified period of time. In addition, regarding the aforementioned operation 650, a type of an input for selecting an AR object desired to be stored among the plurality of AR objects is not limited only to the drag input. According to various embodiments, as a user input for selecting the AR object desired to be stored among the plurality of AR objects, a multi-touch input may be used in which at least two points on the screen are touched.

According to an embodiment, the image processing module 200 may omit the execution of operations 640 and 670. For example, the image processing module 200 may perform only up to the operation 630 in which the AR object selected from among the plurality of AR objects is set as the main AR object in response to reception of the force touch input or the operation 660 in which the number of the at least one AR object is confirmed among the plurality of AR objects in response to reception of the drag input. In this case, in operation 680, if the input is the capture input, the image processing module 200 may perform the operation 640 or 670 to create the capture image file by including information indicating the main AR object or may create the capture image file by including information indicating the confirmed number of AR objects.

According to an embodiment, even if the force touch input is not received, the image processing module 200 may set any one of the plurality of AR objects as the main AR object, based on a priority of the plurality of AR objects. The priority may be set by, for example, user's preference information (e.g., a search history), recommendation information, or the like.

According to an embodiment, even if the drag input is not received, the image processing module 200 may confirm the number of the plurality of AR objects, and may create the capture image file by including information on the confirmed number. For example, the image processing module 200 may create the capture image file by adding information on the total number of the plurality of AR objects output on the screen to an extended region of the capture image file. In addition, if one AR object is included in the screen, the image processing module 200 may create the capture image file by including information indicating that the number of the AR objects is one. In this case, the image processing module 200 may set the one AR object as the AR object.

As described above, according to various embodiment, an image processing method of an electronic device (e.g., the electronic device 101) may include obtaining an image, outputting, to a display (e.g., the display device 160) of the electronic device, a screen on which at least one augmented reality (AR) object is added to the obtained image, creating a file including a capture image of the screen and information related to the at least one AR object in response to reception of a capture input for the screen, and storing the file in a memory (e.g., the memory 130) of the electronic device.

According to various embodiments, the obtaining of the image may include obtaining, from a camera (e.g., the camera module 180) included in the electronic device, an image captured by the camera as the image, or obtaining the image from an external electronic device coupled through a communication module (e.g., the communication module 190) included in the electronic device.

According to various embodiments, the creating of the file may include storing information related to the at least one AR object in an extended region of the file having an extended image file format.

According to various embodiments, the image processing method may further include, if a type of additional information on an object of interest corresponding to the at least one AR object among objects included in the obtained image is an image and is not a text image, allowing image data of the additional information to be included in the information related to the AR object.

According to various embodiments, the image processing method may further include, if a type of additional information on an object of interest corresponding to the at least one AR object among objects included in the obtained image is a text image, extracting the text from the additional information, and allowing the extracted text to be included in the information related to the AR object.

According to various embodiments, the image processing method may further include, if a type of additional information on an object of interest corresponding to the at least one AR object among objects included in the obtained image is not an image, storing the additional information in the memory or an external electronic device coupled through a communication module included in the electronic device, and allowing storage location information of the additional information to be included in the information related to the AR object.

According to various embodiments, the image processing method may further include, if the additional information is stored in the external electronic device, setting storage location information of the additional information as link information for accessing the external electronic device, and if the additional information is stored in the memory, setting the storage location information of the additional information as storage address information of the memory.

According to various embodiments, the image processing method may further include, in a state where the at least one AR object includes a plurality of AR objects, if a user input in which a pressure greater than or equal to a specified magnitude is applied at a point on the screen for a specified period of time, setting an AR object corresponding to an input location of the user input among the plurality of AR objects as a main AR object, and allowing information indicating that the AR object is the main AR object to be included in information related to the AR object.

According to various embodiments, the image processing method may further include, in a state where the at least one AR object includes a plurality of AR objects, if a user input which continues from a first point to a second point on the screen is received, confirming the number of at least one AR object included in an input region of the user input, determined by the first point and the second point, among the plurality of AR objects, and allowing information on the determined number of the at least one AR object to be included in information related to the AR object.

According to various embodiments, the image processing method may further include, in a state where the at least one AR object includes a plurality of AR objects, if a user input which continues from a first point to a second point on the screen is received, selecting at least one AR object included in an input region of the user input, determined by the first point and the second point, among the plurality of AR objects, and excluding information on another AR object other than the selected at least one AR object from information related to the AR object.

Figure 7:
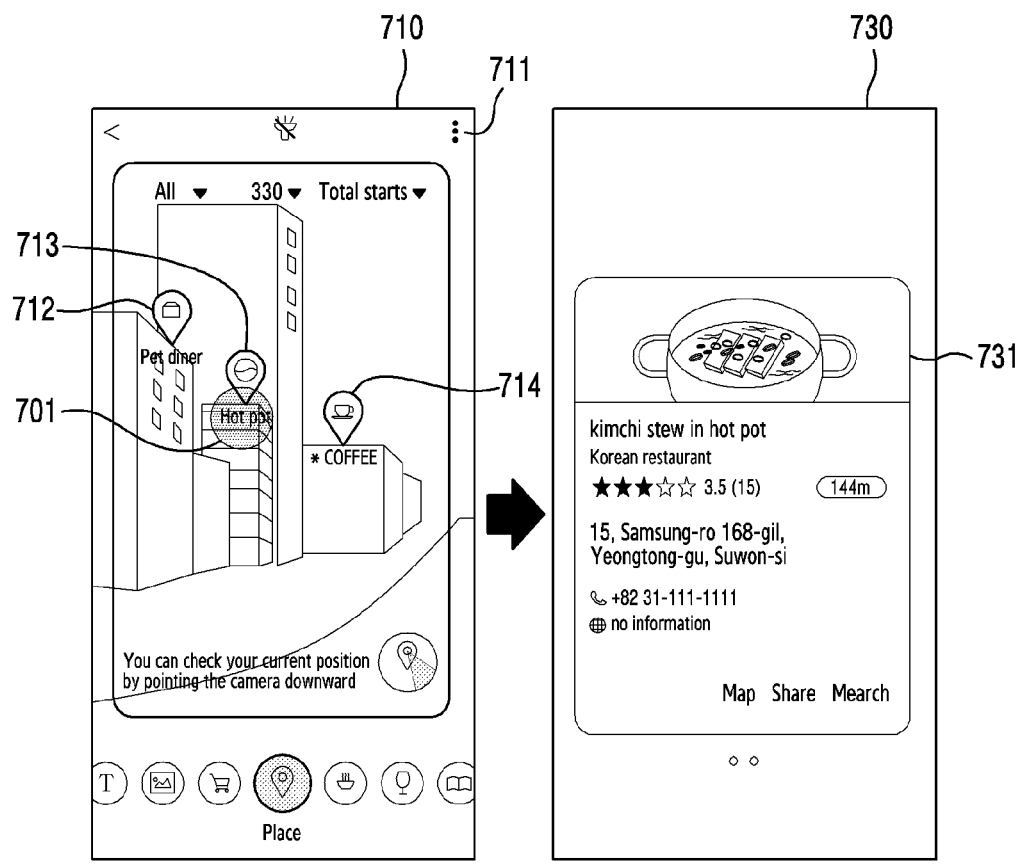
FIG. 7 is a drawing for explaining an AR situation according to an embodiment of the disclosure.

FIG. 7 is a drawing for explaining an AR situation according to an embodiment of the disclosure.

Referring to FIG. 7, the electronic device 101 may output to the display device 160 a first screen 710 on which an AR is implemented, through the image displaying module 250 of the image processing module 200. For example, the image obtaining module 210 of the image processing module 200 may obtain an image 711 (e.g., a camera preview image) captured from the camera module 180, and the AR implementing module 230 of the image processing module 200 may analyze the obtained image 711 to recognize and extract objects from the obtained image 711 and determine a specific number of objects of interest among the extracted objects. In addition, the AR implementing module 230 may obtain additional information on the determined object of interest, create an AR object (e.g., a first AR object 712, a second AR object 713, or a third AR object 714) indicating the presence of the additional information on the object of interest, and add (or synthesize) the AR object (e.g., the first AR object 712, the second AR object 713, or the third AR object 714) to the obtained image 711. Thereafter, the image displaying module 250 may output to the display device 160 the first screen 710 on which an AR is implemented and on which the AR object (e.g., the first AR object 712, the second AR object 713, or the third AR object 714) is added to the obtained image 711.

Upon receiving a user input 701 (e.g., a touch input) for selecting any one AR object (e.g., the second AR object 713) in the first screen 710, the image processing module 200 may output to the display device 160 a second screen 730 including additional information 731 for an object of interest corresponding to the selected AR object (e.g., the second AR object 713).

Upon receiving a capture input for the first screen 710, the image processing module 200 may create a capture image file by including a capture image of the first screen 710 and information related to the AR object (e.g., the first AR object 712, the second AR object 713, or the third AR object 714) included in the first screen 710. Herein, the information related to the AR object may include the additional information 731 on the object of interest corresponding to the AR object, information on a type of the additional information 731, storage location information of the additional information 731, location information of the AR object, information on the number of AR objects, information on whether the AR object is a main AR object, or the like.

According to an embodiment, the image processing module 200 may create the capture image file by using the obtained image 711. For example, the image processing module 200 may create the capture image file by including the obtained image 711 and information related to the AR object (e.g., the first AR object 712, the second AR object 713, or the third AR object 714) included in the first screen 710. In this case, when the capture image file is searched for, the image processing module 200 may provide an original image obtained from the camera module 180, i.e., the obtained image 711, directly to the user, create the AR object (e.g., the first AR object 712, the second AR objet 713, or the third AR object 714) by using information related to the AR object included in the capture image file, and provide the user with the created AR object synthesized with the obtained image 711.

According to an embodiment, upon receiving a capture input for the first screen 710, the image processing module 200 may obtain (or load) information related to the AR object, for example, additional information on an object of interest corresponding to the AR object in background, and may add it to the capture image file.

Figure 8:
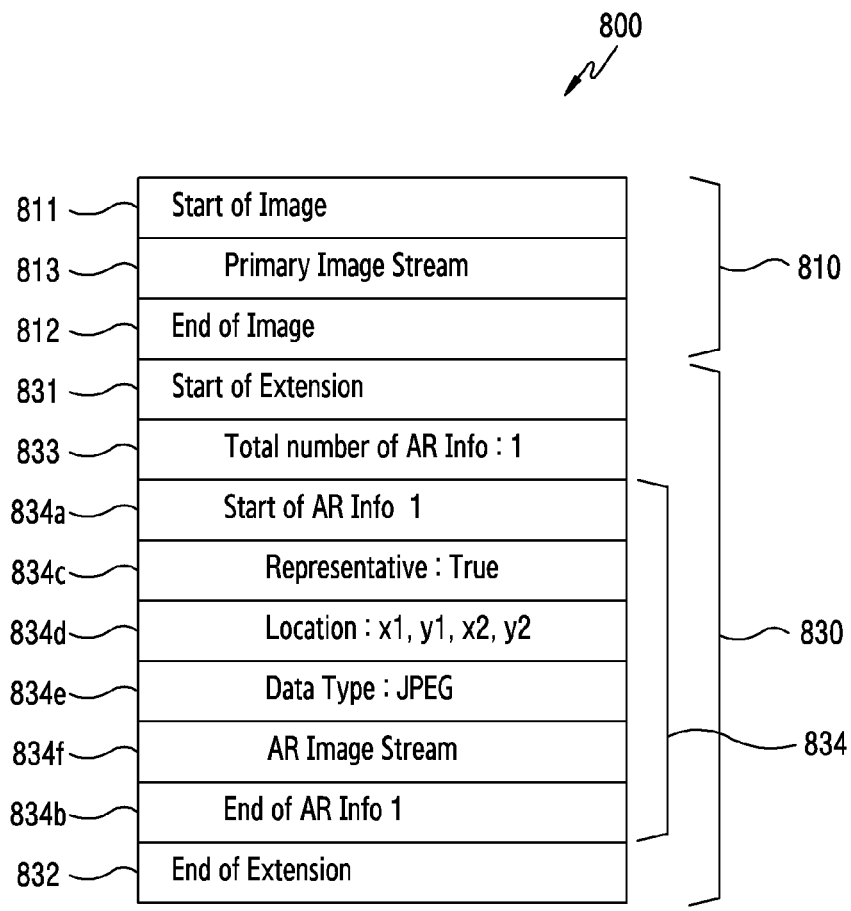
FIG. 8 is a drawing for explaining a structure of a capture image file according to an embodiment of the disclosure.

FIG. 8 is a drawing for explaining a structure of a capture image file according to an embodiment of the disclosure.

Referring to FIG. 8, upon capturing a screen (e.g., the first screen 710) on which an AR is implemented, the electronic device 101 may create a capture image file by including a capture image for the screen and information related to an AR object included in the screen through the image processing module 200. In a structure 800 of the capture image file, the capture image file may be divided into a main region 810 and an extended region 830.

The main region 810 may be divided by first tag information 811 indicating a start of the main region 810 and second tag information 812 indicating an end of the main region 810. Data 813 (e.g., an image stream) of the capture image for the screen may be stored between the first tag information 811 and the second tag information 812.

The extended region 830 may be divided by third tag information 831 indicating a start of the extended region 830 and fourth tag information 832 indicating an end of the extended region 830. Information 833 indicating the number of AR objects included in the screen and information 834 related to each AR object included in the screen may be stored between the third tag information 831 and the fourth tag information 832.

The information 834 related to each AR object may be divided by fifth tag information 834*a* indicating a start of the information 834 related to each AR object and sixth tag information 834*b* indicating an end of the information 834 related to each AR object. Information 834*c* indicating whether each AR object is a main AR, information 834*d* of each AR object, data 834*f* of additional information on an object of interest corresponding each AR, and information 834*e* on a type of the additional information may be stored between the fifth tag information 834*a* and the sixth tag information 834*b*. For example, if the type of the additional information is an image, the data 834*f* of the additional information may be an image stream of the additional information, and the information 834*e* on the type of the additional information 834*f* may be a data format of the image stream.

Figure 9:
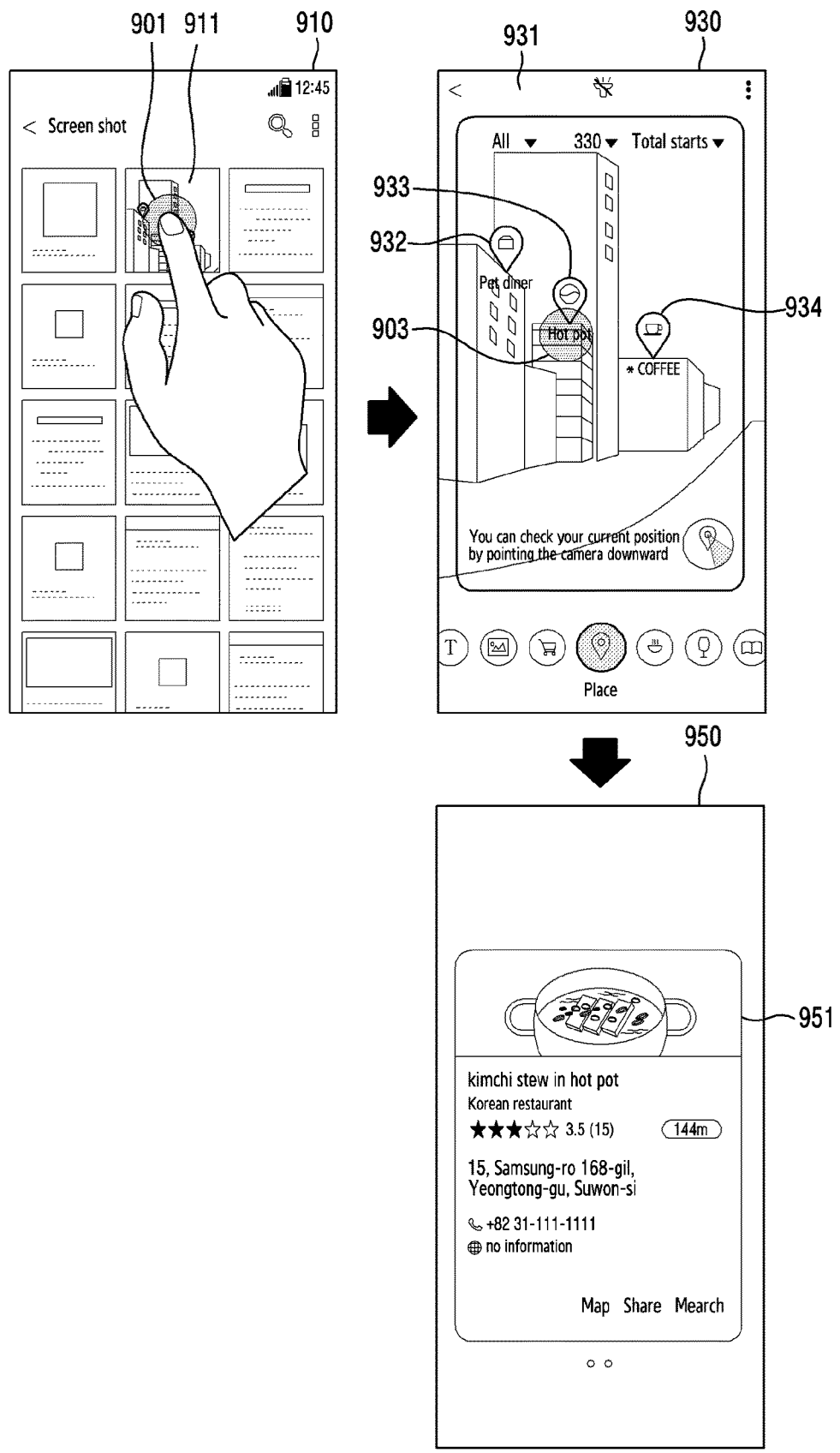
FIG. 9 is a drawing for explaining a function related to searching for a capture image file according to an embodiment of the disclosure.

FIG. 9 is a drawing for explaining a function related to searching for a capture image file according to an embodiment of the disclosure.

Referring to FIG. 9, upon capturing a screen (e.g., the first screen 710) on which an AR is implemented, the electronic device 101 may create a capture image file by including a capture image for the screen and information related to an AR object included in the screen through the image processing module 200, and may store the created capture image file in the memory 130. In addition, the electronic device 101 may search for the capture image file stored in the memory 130 through an image search application (e.g., a gallery application) or the like. For example, upon executing the image search application, the electronic device 101 may output to the display device 160 a first screen 910 including thumbnail images of image files stored in the memory 130. According to an embodiment, in case of a thumbnail image of a capture image file having information related to the AR object, unlike a thumbnail image of a general capture file, an icon indicating the presence of the information related to the AR object may be output on the thumbnail image, which means that the information related to the AR object can be expressed together.

Upon receiving a first user input 901 for selecting a thumbnail image 911 of a capture image file from among thumbnail images of image files included in the first screen 910, the electronic device 101 may obtain a capture image 931 included in a capture image file corresponding to the selected thumbnail image 911. In addition, the electronic device 101 may search for additional information related to an AR object stored in an extended region of the capture image file. In the presence of the additional information, the electronic device 101 may use the additional information to create at least one AR object (e.g., a first AR object 932, a second AR object 933, or a third AR object 934) to be synthesized with the capture image 931, and may output to the display device 160 a second screen 930 on which the at least one AR object is added (or synthesized).

Upon receiving a second user input 903 for selecting any one AR object (e.g., a second AR object 933) included in the second screen 930, the electronic device 101 may obtain additional information 951 on an object of interest corresponding to the selected AR object (e.g., the second AR object 933) from the extended region of the capture image file, and may output to the display device 160 a third screen 950 including the obtained additional information 951.

The electronic device 101 may obtain the additional information 951 on the object of interest, based on information related to the AR object included in the capture image file. For example, if data of the additional information 951 on the object of interest is included in the information related to the AR object (e.g., if a type of the additional information 951 is an image), the electronic device 101 may obtain the additional information 951 (e.g., the image) by using data of the additional information 951. As another example, if a text extracted from the additional information 951 on the object of interest is included in the information related to the AR object (e.g., if the type of the additional information 951 is a text image), the electronic device 101 may obtain the additional information 951 (e.g., a text image) by using the extracted text. As another example, if storage location information of the additional information 951 on the object of interest is included in the information related to the AR object (e.g., if the type of the additional information 951 is a video, a document, or a data type having a format which is difficult to be displayed on a screen through an image search application), the electronic device 101 may obtain the additional information 951 by accessing an external server corresponding to link information when the storage location information of the additional information 951 includes link information, and may obtain the additional information 951 from the memory 130 when the storage location information of the additional information 951 includes storage address information of the memory 130.

Figure 10:
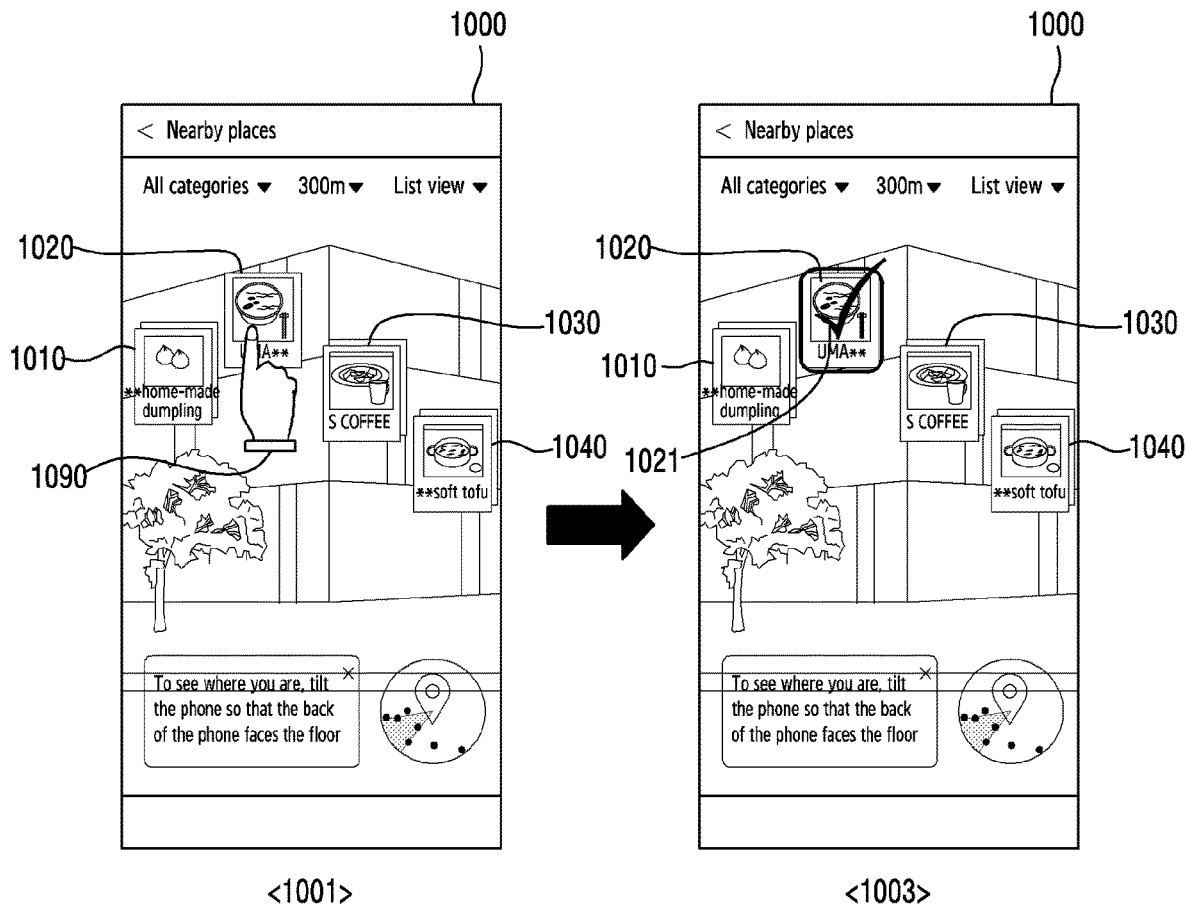
FIG. 10 is a drawing for explaining a method of processing a first user input on a screen including a plurality of AR objects according to an embodiment of the disclosure.

FIG. 10 is a drawing for explaining a method of processing a first user input on a screen including a plurality of AR objects according to an embodiment of the disclosure.

Referring to FIG. 10, upon receiving a first user input 1090 for selecting any one AR object in a screen 1000 including a plurality of AR objects (e.g., a first AR object 1010, a second AR object 1020, a third AR object 1030, or a fourth AR object 1040), the electronic device 101 may set the selected AR object (e.g., the second AR object 1020) as a main AR object. The first user input 1090 may include, for example, a force touch input in which a pressure greater than or equal to a specified magnitude is applied at a point on the screen 1000 for a specified period of time.

When the first user input 1090 occurs in the screen 1000 as shown in a first state 1001, the electronic device 101 may set an AR object (e.g., the second AR object 1020) corresponding to an input location of the first user input 1090 as the main AR object. In addition, when the main AR object is set, as shown in a second state 1003, the electronic device 101 may display on the screen 1000 a display object 1021 indicating that the main AR object is set. Although a state where the display object 1021 is displayed on the second AR object 1020 set as the main AR object is shown in FIG. 10, the disclosure is not limited thereto. According to various embodiments, the display object 1021 may be displayed at a partial region (e.g., an upper-end region) of the screen 1000 by including a text indicating that the second AR object 1020 is set as the main AR object. In addition, the electronic device 101 may change a graphical element of the AR object (e.g., the second AR object 1020) which is set as the main AR object. For example, the electronic device 101 may change a shape, color, boundary thickness, boundary color, or the like of the AR object set as the main AR object so that the AR object (e.g., the second AR object 1020) set as the main AR object can be identified from another AR object (e.g., the first AR object 1010, the third AR object 1030, or the fourth AR object 1040).

Figure 11:
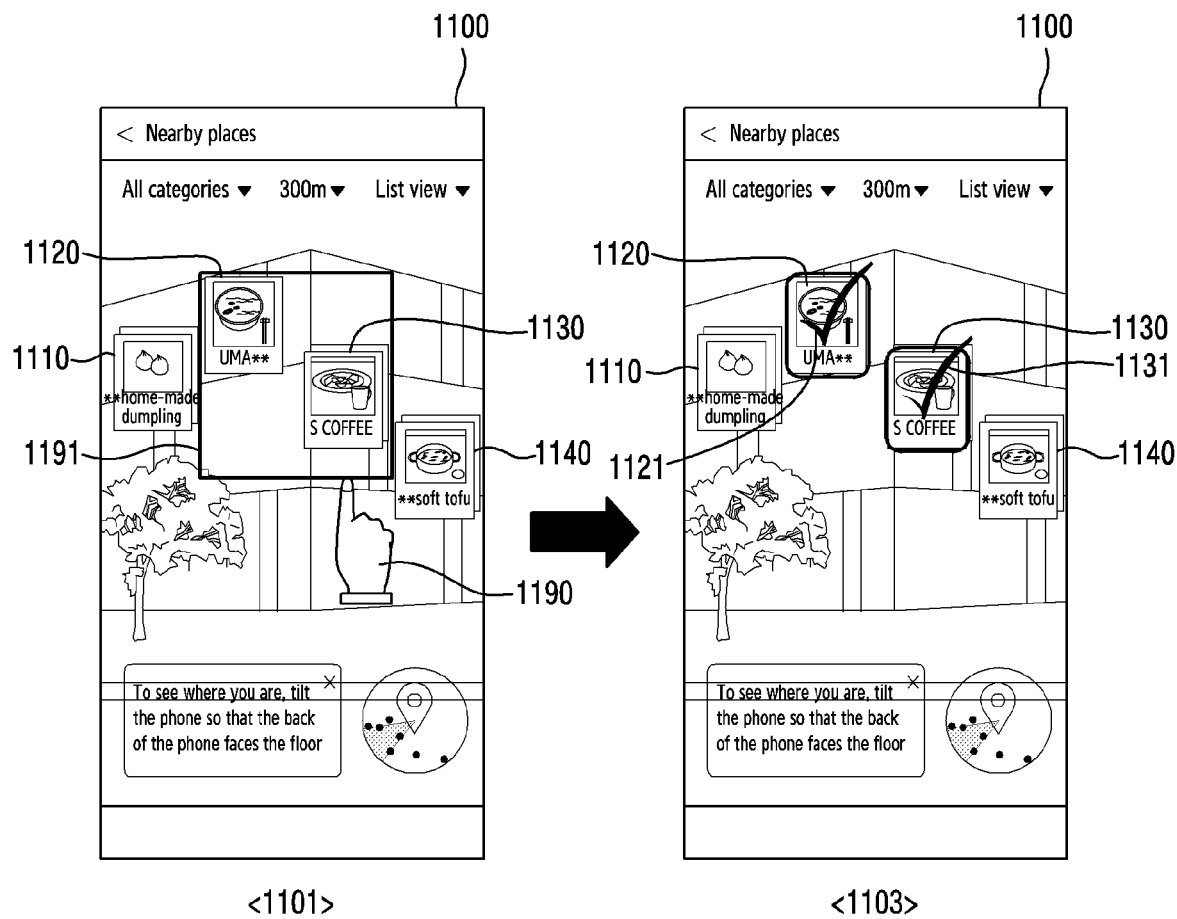
FIG. 11 is a drawing for explaining a method of processing a second user input on a screen including a plurality of AR objects according to an embodiment of the disclosure.

FIG. 11 is a drawing for explaining a method of processing a second user input on a screen including a plurality of AR objects according to an embodiment of the disclosure.

Referring to FIG. 11, upon receiving a second user input 1190 for selecting at least one AR object in a screen 1100 including a plurality of AR objects (e.g., a first AR object 1110, a second AR object 1120, a third AR object 1130, or a fourth AR object AR 1140), the electronic device 101 may identify the selected at least one AR object (e.g., the second AR object 1120 and the third AR object 1130), and may confirm the number of the AR objects. The second user input 1190 may include, for example, a drag input which continues from a first point (a start point) to a second point (an end point) on the screen 1100 (i.e., a touch object such as a finger moves continuously without being taken off from the screen).

When the second user input 1090 occurs in the screen 1100 as shown in a first state 1101, the electronic device 101 may identify at least one AR object (e.g., a second AR object 1120 and a third AR object 1130) corresponding to an input location of the second user input 1190, and may confirm the number of the AR objects. For example, the electronic device 101 may identify at least one AR object (e.g., the second AR object 1120 and the third AR object 1130) included in an input region 1191 corresponding to the input location (a rectangular region determined by the start point and end point of the drag input) among the plurality of AR objects (e.g., the first AR object 1110, the second AR object 1120, the third AR object 1130, or the fourth AR object 1140) output on the screen 1100, and may confirm the number of the AR objects.

Upon selecting at least one AR object (e.g., the second AR object 1120 and the third AR object 1130) by the second user input 1190, as shown in a second state 1103, the electronic device 101 may display, on the screen 1100, display objects 1121 and 1131 indicating that the at least one AR object is selected. Although a state where the first display object 1121 and the second display object 1131 are displayed respectively on the selected second AR object 1120 and third AR object 1130 is shown in FIG. 11, the disclosure is not limited thereto. According to various embodiments, the electronic device 101 may display, on a partial region (e.g., an upper-end region) of the screen 1100, one display object including a text indicating that the second AR object 1120 and the third AR object 1130 are selected. In addition, the electronic device 101 may change a graphical element of the selected at least one AR object (e.g., the second AR object 1120 and the third AR object 1130). For example, the electronic device 101 may change a shape, color, boundary thickness, boundary color, or the like of the selected at least one AR object so that the selected at least one AR object (e.g., the second AR object 1120 and the third AR object 1130) can be identified from another AR object (e.g., the first AR object 1110 and the fourth AR object 1140).

According to an embodiment, upon selecting at least one AR object (e.g., the second AR object 1120 and the third AR object 1130) by the second user input 1190, the electronic device 101 may add only information related to the selected one AR object to a capture image file. For example, the electronic device 101 may not add information related to other AR objects (e.g., the first AR object 1110 and the fourth AR object 1140) except for the selected one AR object to the capture image file.

Figure 12:
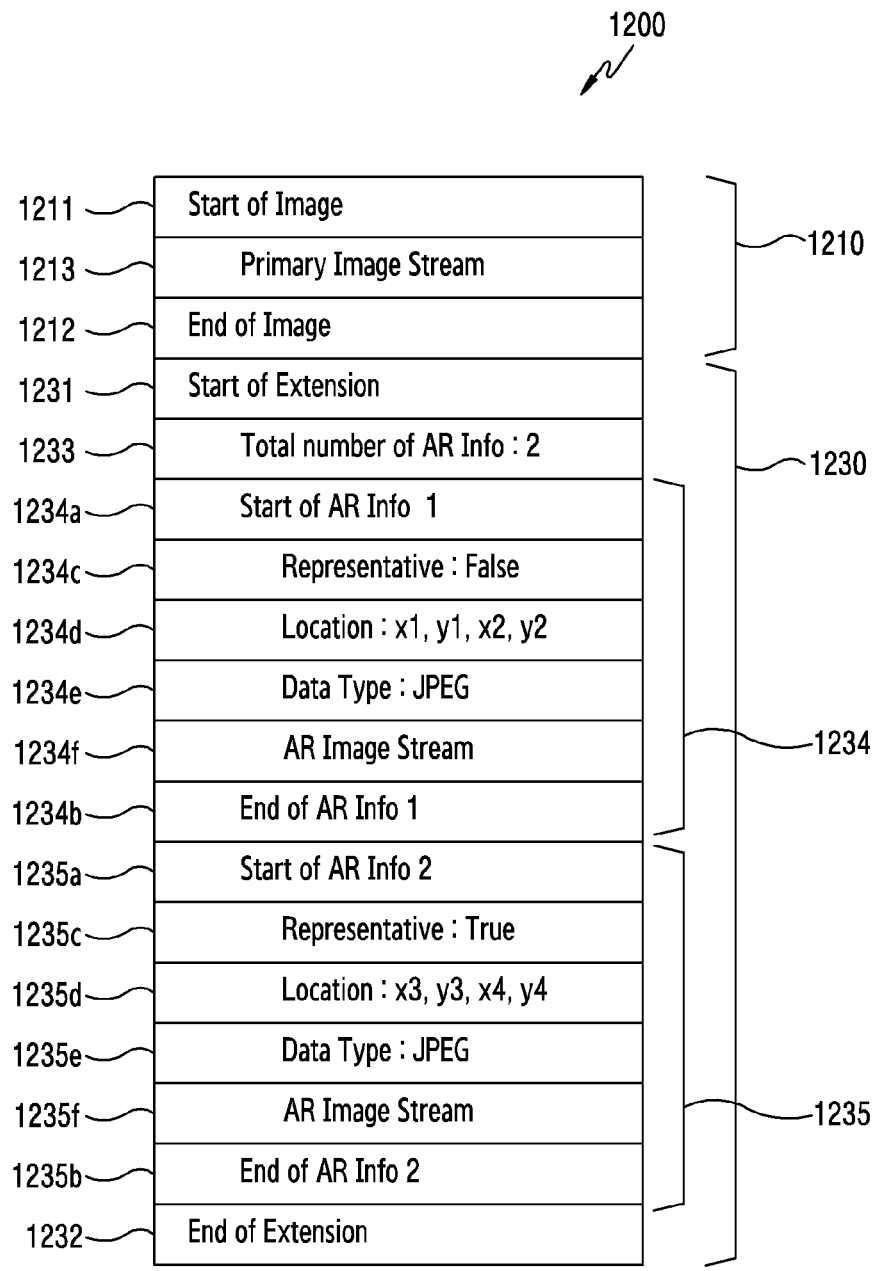
FIG. 12 is a drawing for explaining a structure of a capture image file including information related to a plurality of AR objects according to an embodiment of the disclosure.

FIG. 12 is a drawing for explaining a structure of a capture image file including information related to a plurality of AR objects according to an embodiment of the disclosure.

Referring to FIG. 12, upon capturing a screen including a plurality of AR objects, the electronic device 101 may create a capture image file by including a capture image for the screen and information related to the plurality of AR objects included in the screen through the image processing module 200. In a structure 1200 of the capture image file, the capture image file may be divided into a main region 1210 and an extended region 1230.

The main region 1210 may be divided by first tag information 1211 indicating a start of the main region 1210 and second tag information 1212 indicating an end of the main region 1210. Data 1213 (e.g., an image stream) of the capture image for the screen may be stored between the first tag information 1211 and the second tag information 1212.

The extended region 1230 may be divided by third tag information 1231 indicating a start of the extended region 1230 and fourth tag information 1232 indicating an end of the extended region 1230. Information 1233 indicating the number of the plurality of AR objects included in the screen and information 1234 and 1235 related to the respective AR objects included in the screen may be stored between the third tag information 1231 and the fourth tag information 1232.

The information 1234 and 1235 related to the respective AR objects may be divided by fifth tag information 1234*a* and 1235*a* indicating starts of the information 1234 and 1235 related to the respective AR objects and sixth tag information 1234*b* and 1235*b* indicating ends of the information 1234 and 1235 related to the respective AR objects. Information 1234*c* and 1235*c* indicating whether the respective AR objects are main ARs, information 1234*d* and 1235*d* of the respective AR objects, data 1234*f* and 1235*f* of additional information on an object of interest corresponding the respective ARs, and information 1234*e* and 1235*e* on a type of the additional information may be stored between the fifth tag information 1234*a* and 1235*a* and the sixth tag information 1234*b* and 1235*b*. FIG. 12 shows a state where the information 1234 related to the first AR object and the information 1235 related to the second AR object set as the main AR object are stored in the extended region 1230.

Figure 13:
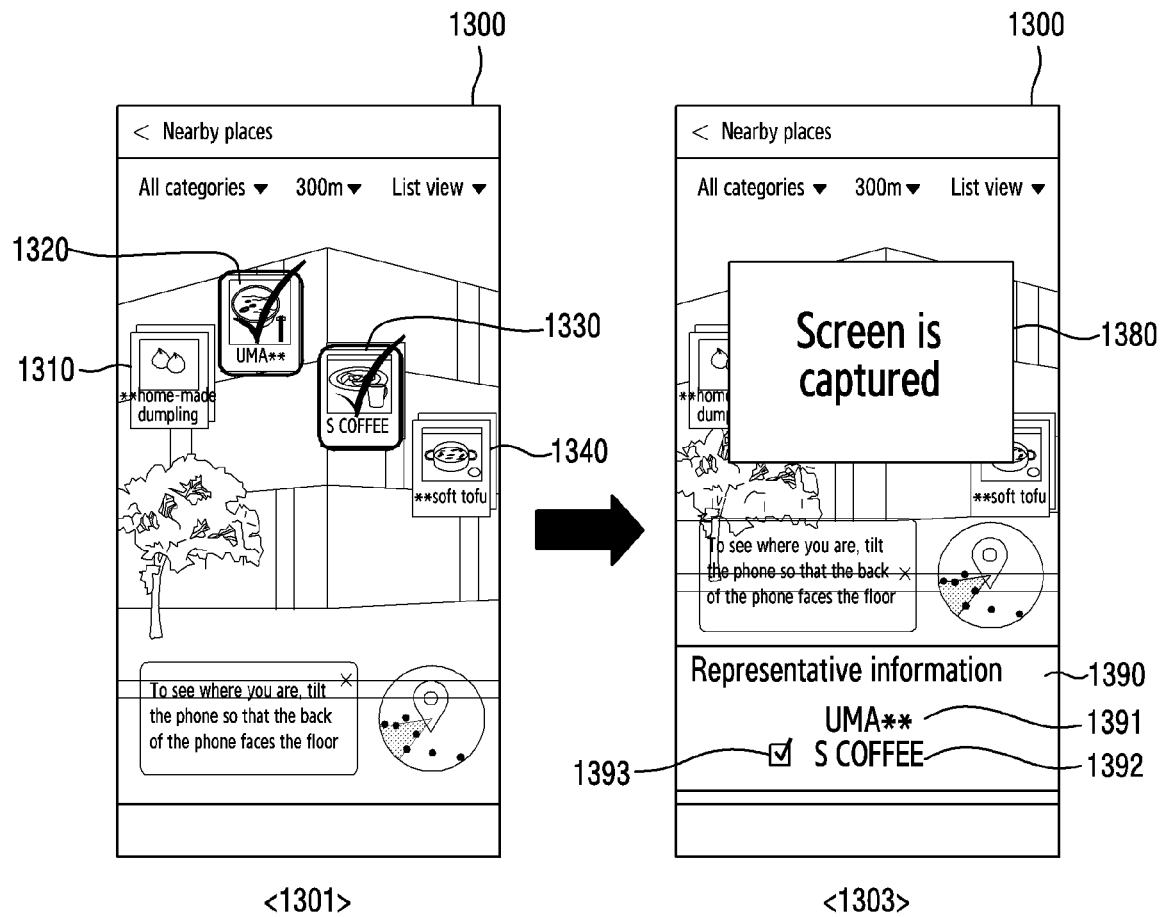
FIG. 13 is a drawing for explaining a method of setting a main AR object among a plurality of AR objects according to an embodiment of the disclosure.

FIG. 13 is a drawing for explaining a method of setting a main AR object among a plurality of AR objects according to an embodiment of the disclosure.

Referring to FIG. 13, upon receiving a capture input for a screen 1300 after selecting at least one AR object (e.g., a second AR object 1320 and a third AR object 1330) in the screen 1300 including a plurality of AR objects (e.g., a first AR object 1310, a second AR object 1320, a third AR object 1330, or a fourth AR object 1340), the electronic device 101 may create a capture image file including a capture image for the screen 1300 and information related to the selected at least one AR object (e.g., the second AR object 1120 and the third AR object 1130).

As shown in a first state 1310, upon selecting at least one AR object (e.g., the second AR object 1320 and the third AR object 1330) from among the plurality of AR objects (e.g., the first AR object 1310, the second AR object 1320, the third AR object 1330, or the fourth AR object 1340) included in the screen 1300 and upon receiving a capture input for the screen 1300, the electronic device 101 may display, on a partial region of the screen 1300, a first display object 1380 indicating that the screen 1300 is captured. In addition, if the at least one AR object is plural in number, the electronic device 101 may provide a user interface capable of selecting any one AR object as a main AR object. For example, as shown in a second state 1303 of FIG. 13, the electronic device 101 may output a second display object 1390 at a partial region (e.g., a lower-end region) of the screen 1300. The second display object 1390 may include, for example, a list object including items 1391 and 1392 corresponding to respective AR objects and a selection box object 1393 for guiding to select any one of the items 1391 and 1392. Upon selecting an item corresponding to any one AR object through the second display object 1390, the electronic device 101 may set an AR object corresponding to the selected item as the main AR object.

Figure 14:
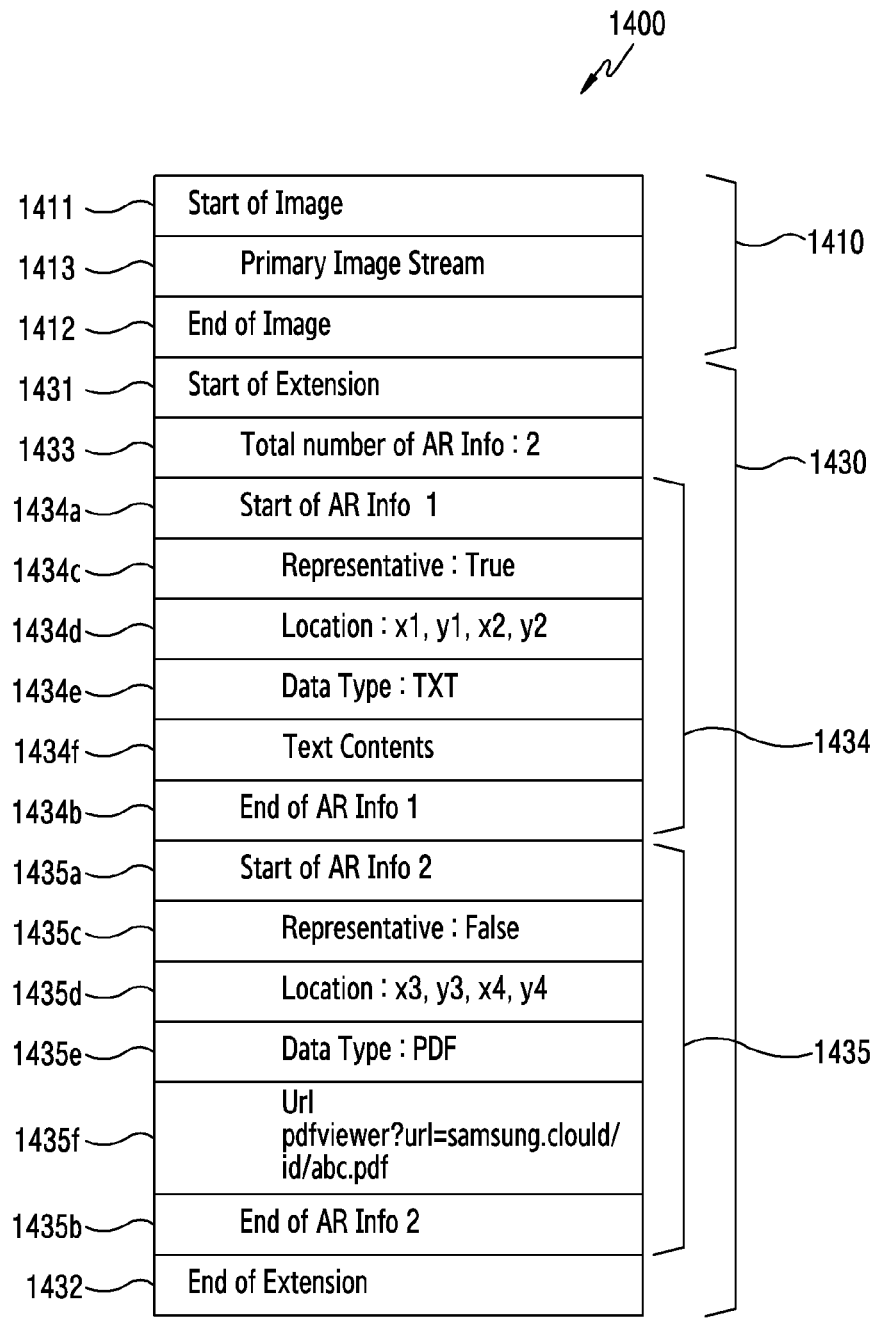
FIG. 14 is a drawing for explaining a structure of a capture image file including storage location information of additional information on an object of interest corresponding to an AR object according to an embodiment of the disclosure.

FIG. 14 is a drawing for explaining a structure of a capture image file including storage location information of additional information on an object of interest corresponding to an AR object according to an embodiment of the disclosure.

Referring to FIG. 14, upon capturing a screen, if a type of additional information on an object of interest corresponding to an AR object included in the screen is not an image, the electronic device 101 may create a capture image file through the image processing module 200 by including a capture image for the screen and storage location information of the additional information on the object of interest. In addition, upon capturing the screen, if the type of the additional information on the object of interest is a text image, the electronic device 101 may create a capture image file by including a capture image for the screen and a text extracted from the text image. In a structure 1400 of the capture image file, the capture image file may be divided into a main region 1410 and an extended region 1430.

The main region 1410 may be divided by first tag information 1411 indicating a start of the main region 1410 and second tag information 1412 indicating an end of the main region 1410. Data 1413 (e.g., an image stream) of the capture image for the screen may be stored between the first tag information 1411 and the second tag information 1412.

The extended region 1430 may be divided by third tag information 1431 indicating a start of the extended region 1430 and fourth tag information 1432 indicating an end of the extended region 1430, information 1433 indicating the number of AR objects included in the screen. Information 1434 and 1435 related to the respective AR objects included in the screen may be stored between the third tag information 1431 and the fourth tag information 1432.

The information 1434 and 1435 related to the respective AR objects may be divided by fifth tag information 1434a and 1435a indicating starts of the information 1434 and 1435 related to the respective AR objects and sixth tag information 1434b and 1435b indicating ends of the information 1434 and 1435 related to the respective AR objects. Information 1434c and 1435c indicating whether the respective AR objects are main ARs, information 1434d and 1435d of the respective AR objects, and information 1434e and 1435e on a type of the additional information on an object of interest corresponding to the respective AR objects may be stored between the fifth tag information 1434a and 1435a and the sixth tag information 1434b and 1435b. In addition, regarding the information 1434 and 1435 related to the respective AR objects, a text 1434f extracted from the additional information or storage location information 1435f of the additional information may be stored according to the information 1434e and 1435e on the type of the additional information. FIG. 14 shows a state where the information 1434 related to the first AR object and the information 1435 related to the second AR object are stored in the extended region 1430. Herein, it is shown a state where a type of additional information on a first object of interest corresponding to the first AR object is a text image, and a type of additional information on a second object of interest corresponding to the second AR object is a document (e.g., a pdf document). Accordingly, the text 1434f extracted from the additional information on the first object of interest may be stored in the information 1434 related to the first AR object. Information indicating a text format may be stored in the information 1434e on a type of the additional information. The storage location information 1435f of additional information on the second object of interest may be stored in the information 1435 related to the second AR object. Information indicating a document format (e.g., a pdf document format) may be stored in the information 1435e on the type of the additional information.

Figure 15A:
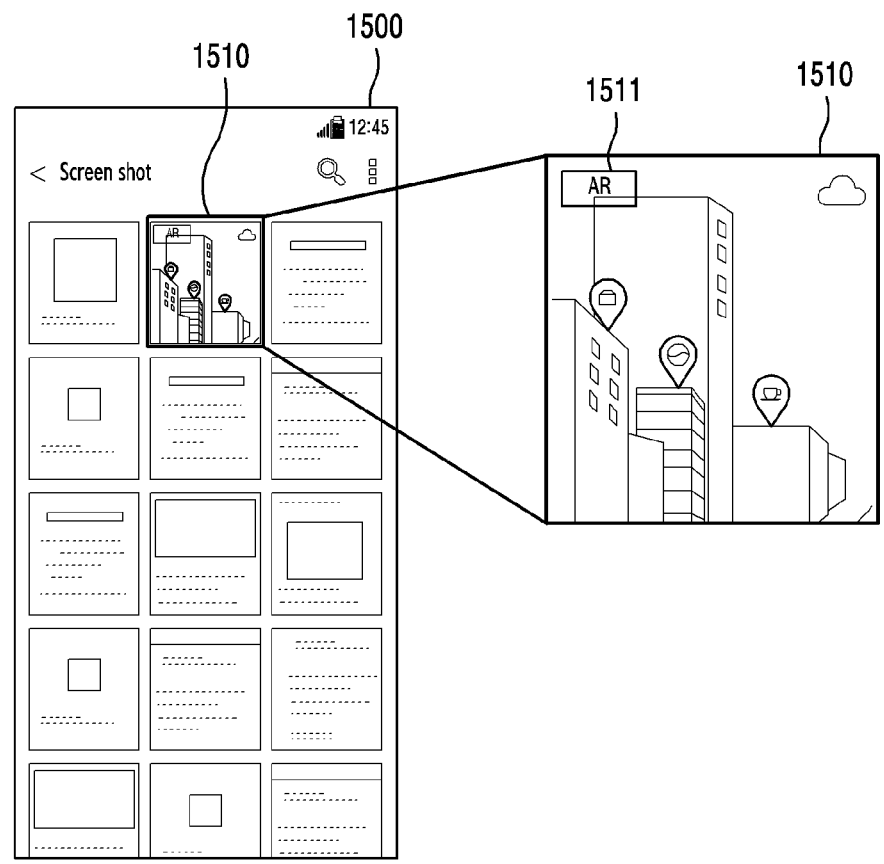
FIG. 15A is a drawing for explaining a thumbnail image of a capture image file according to an embodiment of the disclosure.
Figure 15B:
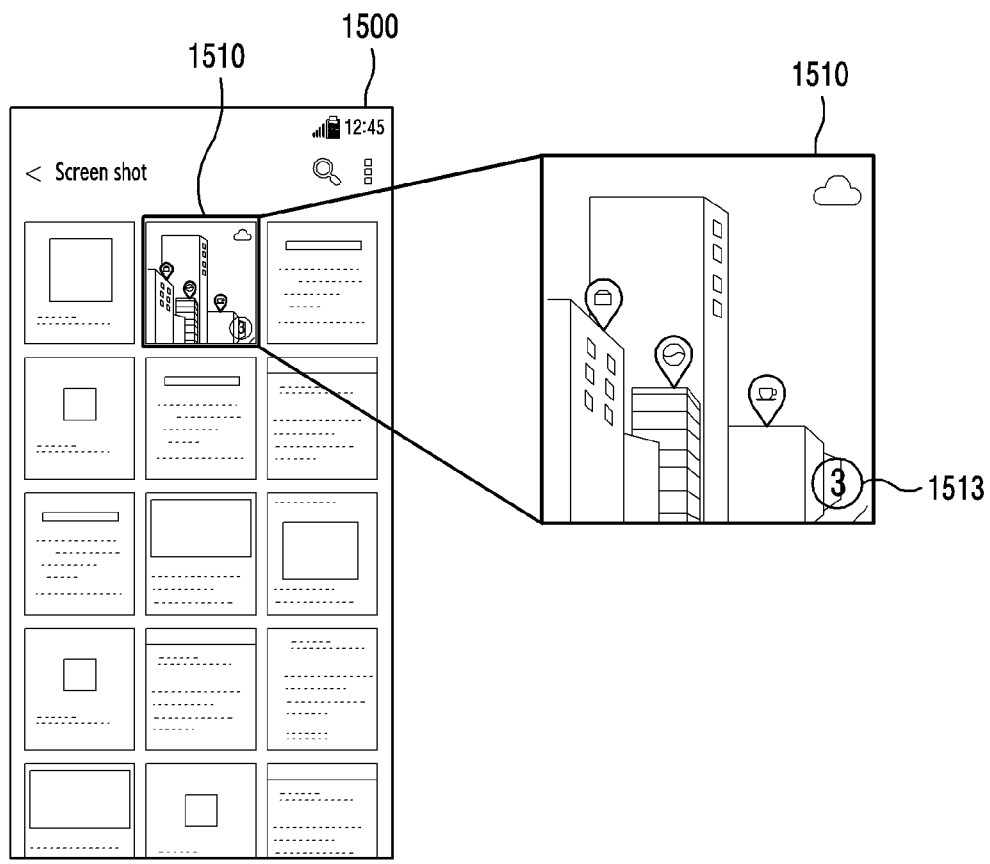
FIG. 15B is a drawing for explaining a thumbnail image of a capture image file according to an embodiment of the disclosure.

FIG. 15A and FIG. 15B are drawings for explaining a thumbnail image of a capture image file according to an embodiment of the disclosure.

Referring to FIG. 15A and FIG. 15B, upon capturing a screen on which an AR is implemented, the electronic device 101 may create a capture image file by including a capture image for the screen and information related to an AR object included in the screen through the image processing module 200, and may store the created capture image file in the memory 130. In addition, the electronic device 101 may search for the capture image file stored in the memory 130 through an image search application (e.g., a gallery application) or the like. For example, upon executing the image search application, the electronic device 101 may output to the display device 160 a screen 1500 including thumbnail images of image files stored in the memory 130.

In order to distinguish a first capture image file for the screen on which the AR is implemented from a general image file (e.g., including a second capture image file for a general screen) among image files stored in the memory 130, the electronic device 101 may create a first thumbnail image 1510 of the first capture image file to be different from a second thumbnail image of another general image file.

According to an embodiment, as shown in FIG. 15A, the electronic device 101 may create the first thumbnail image 1510 by adding a display object 1511 (e.g., an icon or an image) indicating that an image corresponding to the first thumbnail image 1510 at a partial region (e.g., a left upper-end region) of the thirst thumbnail image 1510 is an image captured in an AR situation (a capture image including information related to an AR object).

According to an embodiment, as shown in FIG. 15B, the electronic device 101 may create the first thumbnail image 1510 by adding a display object 1513 indicating information on the number of AR objects included in the first capture image file to a partial region (e.g., a right lower-end region) of the first thumbnail image 1510.

According to an embodiment, the electronic device 101 may create the first thumbnail image 1510 by adding a thumbnail image of additional information on an object of interest included in the first capture image file to a partial region (e.g., a right lower-end region) of the first thumbnail image. In this case, when additional information on a plurality of objects of interest is included in the first capture file, the electronic device 101 may add thumbnail images of the additional information on the plurality of objects of interest to a partial region of the first thumbnail image 1510 in parallel in the order of corresponding AR objects. In addition, in order to distinguish a third thumbnail image of additional information on a first object of interest corresponding to a main AR object from a fourth thumbnail image of additional information on a second object of interest among the plurality of objects of interest, the electronic device 101 may add the third thumbnail image to the partial region of the first thumbnail image 1510 by differently setting a graphical element, e.g., a shape, color, boundary thickness, boundary color, or the like of the third thumbnail image.

According to an embodiment, the electronic device 101 may create the first thumbnail image 1510 by adding an image indicating a type of additional information on an object of interest included in the first capture image file to a partial region (e.g., a right lower-end region) of the first thumbnail image 1510. In this case, when additional information on a plurality of objects of interest is included in the first capture image file, the electronic device 101 may add images indicating a type of the additional information on the plurality of objects of interest to the partial region of the first thumbnail image 1510 in parallel in the order of corresponding AR objects. In addition, in order to distinguish a first image indicating a type of additional information on a first object of interest corresponding to a main AR object from a second image indicating a type of additional information on additional information on a second object of interest among the plurality of objects of interest, the electronic device 101 may add the first image to the partial region of the first thumbnail image 1510 by differently setting a graphical element, e.g., a shape, color, boundary thickness, boundary color, or the like of the first image.

Figure 16:
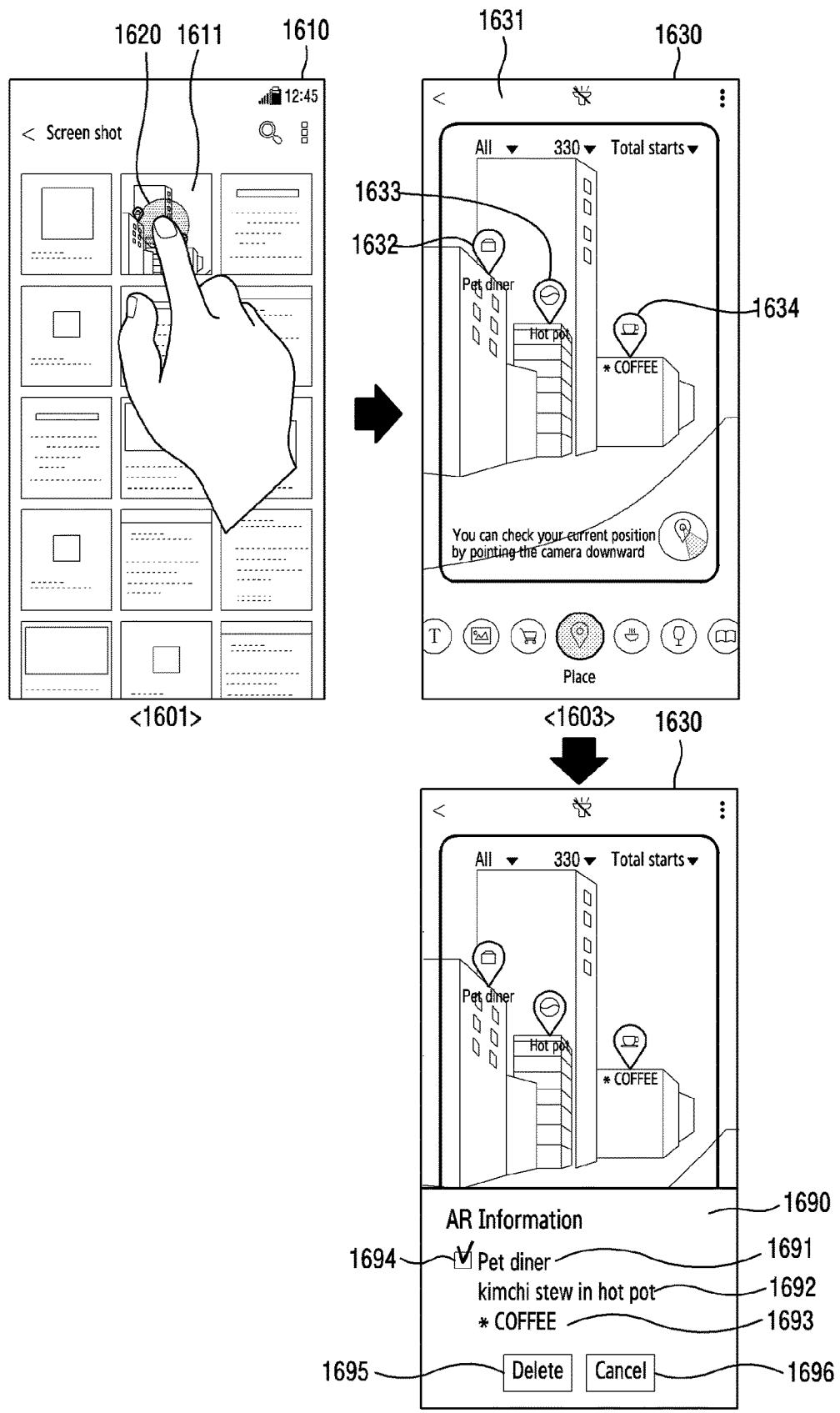
FIG. 16 is a drawing for explaining a method of editing information related to an AR object according to an embodiment of the disclosure.

FIG. 16 is a drawing for explaining a method of editing information related to an AR object according to an embodiment of the disclosure.

Referring to FIG. 16, upon capturing a screen on which an AR is implemented, the electronic device 101 may create a capture image file by including a capture image for the screen and information related to an AR object included in the screen through the image processing module 200, and may store the created capture image file in the memory 130. In addition, the electronic device 101 may edit information related to an AR object included in the capture image file stored in the memory 130.

In addition, the electronic device 101 may search for the capture image file stored in the memory 130 through an image search application (e.g., a gallery application) or the like. For example, upon executing the image search application, as shown in a first state 1610, the electronic device 101 may output to the display device 160 a first screen 1610 including a thumbnail image 1611 of the capture image file stored in the memory 130.

Upon receiving a user input 1620 for selecting the thumbnail image 1611 of the capture image file in the first screen 1610, as shown in a second state 1603, the electronic device 101 may output to the display device 160 a second screen 1630 on which an AR object (e.g., a first AR object 1632, a second AR object 1633, or a third AR object 1634) is added to a capture image 1631 included in a capture image file corresponding to the selected thumbnail image 1611.

When a specified time elapses after the second screen 1630 is output or when a specified user input occurs in the second screen 1630, as shown in a third state 1605, the electronic device 101 may provide a user interface capable of editing information related to an AR object included in the capture image file to a partial region (e.g., a lower-end region) of the second screen 1630. For example, the electronic device 101 may output a display object 1690 for the editing at the partial region of the second screen 1630. The display object 1690 may include, for example, a list object including items 1691, 1692, and 1693 corresponding to respective AR objects, a selection box object 1694 for guiding to select any one of the items 1691, 1692, and 1693, a first button 1695 for requesting to delete information related to an AR object corresponding to the selected item, and a second button 1696 for requesting to end outputting of the display object 1690.

Although only an editing function in which the display object 1690 deletes any one piece of information related to a plurality of AR objects included in the capture image file is illustrated in FIG. 16, the editing function using the display object 1690 is not limited thereto. According to various embodiments, the editing function may further include a function of changing a main AR object among the plurality of AR objects.

According to an embodiment, the electronic device 101 may update additional information on an object of interest corresponding to an AR object included in the capture image file in background, while outputting the second screen 1630 to the display device 160 in response to the user input 1620. For example, the electronic device 101 may confirm whether to change or add the additional information on the object of interest from an external electronic device (e.g., the electronic device 102, the electronic device 104, or the server 108) through the communication module 190, and if there is the changed or added additional information, may update the changed or added additional information received from the external electronic device.

According to various embodiments, the electronic device 101 may share a capture image file for a screen on which an AR is implemented, with the external electronic device (e.g., the electronic device 102, the electronic device 104, or the server 108) through the communication module 190. In this case, the electronic device 101 may determine whether the external electronic device is a device capable of recognizing information related to an AR object included in the capture image file. If the external electronic device is the device capable of recognizing the information related to the AR object included in the capture image file, the electronic device 101 may transmit the capture image file directly to the external electronic device. If the external electronic device is a device not capable of recognizing the information related to the AR object included in the capture image file, the electronic device 101 may separate a capture image and the information related to the AR object from the capture image file, and may transmit them separately to the external electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a display;
a memory storing instructions; and
a processor operatively coupled with the display and the memory,
wherein the instructions when executed by the processor cause the electronic device to:
obtain an image;
output, to a display, a screen on which at least one Augmented Reality (AR) object is added to the obtained image;
create a file including a capture image of the screen and information related to the at least one AR object in response to reception of a capture input for the screen;
store the file in the memory; and
store information related to the at least one AR object in an extended region of the file having extended image file format.

2. The electronic device of claim 1, wherein the instructions when executed by the processor cause the electronic device to:
obtain, from a camera included in the electronic device, an image captured by the camera as the image; or
obtain the image from an external electronic device coupled through a communication module included in the electronic device.

3. The electronic device of claim 1, wherein the instructions when executed by the processor cause the electronic device to:
if a type of additional information on an object of interest corresponding to the at least one AR object among objects included in the obtained image is an image and is not a text image, allow image data of the additional information to be included in the information related to the AR object.

4. The electronic device of claim 1, wherein the instructions when executed by the processor cause the electronic device to:
if a type of additional information on an object of interest corresponding to the at least one AR object among objects included in the obtained image is a text image, extract the text from the additional information, and allow the extracted text to be included in the information related to the AR object.

5. The electronic device of claim 1, wherein the instructions when executed by the processor cause the electronic device to:
if a type of additional information on an object of interest corresponding to the at least one AR object among objects included in the obtained image is not an image, store the additional information in the memory or an external electronic device coupled through a communication module included in the electronic device, and allow storage location information of the additional information to be included in the information related to the AR object.

6. The electronic device of claim 5, wherein the instructions when executed by the processor cause the electronic device to:
if the additional information is stored in the external electronic device, set storage location information of the additional information as link information for accessing the external electronic device, and if the additional information is stored in the memory, set the storage location information of the additional information as storage address information of the memory.

7. The electronic device of claim 1,
wherein the at least one AR object includes a plurality of AR objects, and
wherein the instructions when executed by the processor cause the electronic device to:
if a user input in which a pressure greater than or equal to a specified magnitude is applied at a point on the screen for a specified period of time, set an AR object corresponding to an input location of the user input among the plurality of AR objects as a main AR object, and allow information indicating that the AR object is the main AR object to be included in information related to the AR object.

8. The electronic device of claim 1,
wherein the at least one AR object includes a plurality of AR objects, and
wherein the instructions when executed by the processor cause the electronic device to:
if a user input which continues from a first point to a second point on the screen is received, determine a number of at least one AR object included in an input region of the user input, determined by the first point and the second point, among the plurality of AR objects, and allow information on the determined number of the at least one AR object to be included in information related to the AR object.

9. The electronic device of claim 1,
wherein the at least one AR object includes a plurality of AR objects, and
wherein the instructions when executed by the processor cause the electronic device to:
if a user input which continues from a first point to a second point on the screen is received, select at least one AR object included in an input region of the user input, determined by the first point and the second point, among the plurality of AR objects, and exclude information on another AR object other than the selected at least one AR object from information related to the AR object.

10. An image processing method of an electronic device, comprising:
obtaining an image;
outputting, to a display of the electronic device, a screen on which at least one Augmented Reality (AR) object is added to the obtained image;
creating a file including a capture image of the screen and information related to the at least one AR object in response to reception of a capture input for the screen; and
storing the file in a memory of the electronic device and storing information related to the at least one AR object in an extended region of the file having extended image file format.

11. The image processing method of claim 10, further comprising, if a type of additional information on an object of interest corresponding to the at least one AR object among objects included in the obtained image is an image and is not a text image, allowing image data of the additional information to be included in the information related to the AR object.

12. The image processing method of claim 10, further comprising, if a type of additional information on an object of interest corresponding to the at least one AR object among objects included in the obtained image is a text image, extracting the text from the additional information, and allowing the extracted text to be included in the information related to the AR object.

13. The image processing method of claim 10, further comprising, if a type of additional information on an object of interest corresponding to the at least one AR object among objects included in the obtained image is not an image, storing the additional information in the memory or an external electronic device coupled through a communication module included in the electronic device, and allowing storage location information of the additional information to be included in the information related to the AR object.

14. The image processing method of claim 13, further comprising, if the additional information is stored in the external electronic device, setting storage location information of the additional information as link information for accessing the external electronic device, and if the additional information is stored in the memory, setting the storage location information of the additional information as storage address information of the memory.

15. The image processing method of claim 10, wherein the obtaining of the image comprises obtaining, from a camera included in the electronic device, an image captured by the camera as the image, or obtaining the image from an external electronic device coupled through a communication module included in the electronic device.

16. The image processing method of claim 10, further comprising, in a state where the at least one AR object includes a plurality of AR objects, if a user input in which a pressure greater than or equal to a specified magnitude is applied at a point on the screen for a specified period of time, setting an AR object corresponding to an input location of the user input among the plurality of AR objects as a main AR object, and allowing information indicating that the AR object is the main AR object to be included in information related to the AR object.

17. The image processing method of claim 10, further comprising, in a state where the at least one AR object includes a plurality of AR objects, if a user input which continues from a first point to a second point on the screen is received, determine a number of at least one AR object included in an input region of the user input, determined by the first point and the second point, among the plurality of AR objects, and allowing information on the determined number of the at least one AR object to be included in information related to the AR object.

18. The image processing method of claim 10, further comprising, in a state where the at least one AR object includes a plurality of AR objects, if a user input which continues from a first point to a second point on the screen is received, selecting at least one AR object included in an input region of the user input, determined by the first point and the second point, among the plurality of AR objects, and excluding information on another AR object other than the selected at least one AR object from information related to the AR object.

* * * * *